US 12,532,091 B2

United States Patent
Numata et al.

(10) Patent No.: US 12,532,091 B2
(45) Date of Patent: Jan. 20, 2026

(54) PHOTOELECTRIC CONVERSION APPARATUS, CONTROL METHOD, AND STORAGE MEDIUM

(71) Applicant: CANON KABUSHIKI KAISHA, Tokyo (JP)

(72) Inventors: Aihiko Numata, Tokyo (JP); Kan Takaiwa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 167 days.

(21) Appl. No.: 18/368,108

(22) Filed: Sep. 14, 2023

(65) Prior Publication Data

US 2024/0107192 A1    Mar. 28, 2024

(30) Foreign Application Priority Data

Sep. 28, 2022   (JP) .................. 2022-154904

(51) Int. Cl.
*H04N 25/68* (2023.01)
*H04N 23/81* (2023.01)
(Continued)

(52) U.S. Cl.
CPC ............ *H04N 25/68* (2023.01); *H04N 23/81* (2023.01); *H04N 25/51* (2023.01); *H04N 25/62* (2023.01); *H10F 39/809* (2025.01)

(58) Field of Classification Search
CPC ........ H04N 23/81; H04N 25/51; H04N 25/62; H04N 25/621; H04N 25/671; H04N 25/674; H04N 25/68; H04N 25/773; H10F 39/809

See application file for complete search history.

(56) References Cited

U.S. PATENT DOCUMENTS

| 5,453,629 A | 9/1995 | Gofuku et al. |
| 5,985,689 A | 11/1999 | Gofuku et al. |

(Continued)

FOREIGN PATENT DOCUMENTS

| JP | H06-151801 A | 5/1994 |
| JP | 2000-092397 A | 3/2000 |

(Continued)

OTHER PUBLICATIONS

Rech et al., "Optical crosstalk in single photon avalanche diode arrays: a new complete model", OpEx, 16 (12), 2008.

(Continued)

*Primary Examiner* — Antoinette T Spinks
(74) *Attorney, Agent, or Firm* — Venable LLP

(57) ABSTRACT

A photoelectric conversion apparatus comprises a photoelectric conversion element including an avalanche photodiode for photoelectrically converting an optical image; an image generating unit configured to generate a first image based on a signal that has been acquired by the photoelectric conversion element; an acquisition unit configured to acquire first characteristic information of the photoelectric conversion element; a first correction processing unit configured to perform first correction processing for correcting linearity of the first image using the first characteristic information; and a second correction processing unit configured to perform second correction processing for performing interpolation based on the first characteristic information and information of the first image.

14 Claims, 18 Drawing Sheets

(51) Int. Cl.
*H04N 25/51* (2023.01)
*H04N 25/62* (2023.01)
*H10F 39/00* (2025.01)

(56) References Cited

U.S. PATENT DOCUMENTS

| | | | |
|---|---|---|---|
| 7,106,371 | B1 | 9/2006 | Kubo et al. |
| 7,349,574 | B1* | 3/2008 | Sodini .................... H04N 23/73 |
| | | | 348/E5.037 |
| 9,319,607 | B2 | 4/2016 | Numata |
| 9,402,041 | B2 | 7/2016 | Numata |
| 9,470,825 | B2 | 10/2016 | Numata et al. |
| 11,199,637 | B2 | 12/2021 | Kobayashi |
| 2007/0194249 | A1* | 8/2007 | Gavrilov ............ G01N 21/6452 |
| | | | 250/459.1 |
| 2016/0309102 | A1* | 10/2016 | Koizumi ............... H04N 25/704 |
| 2017/0070692 | A1 | 3/2017 | Lin et al. |
| 2017/0104943 | A1* | 4/2017 | Toyoda ................ H04N 25/672 |
| 2018/0275252 | A1* | 9/2018 | Fried ....................... G01S 17/04 |
| 2020/0166656 | A1 | 5/2020 | Kobayashi |
| 2022/0116555 | A1 | 4/2022 | Gascón Fora et al. |
| 2024/0107192 | A1* | 3/2024 | Numata ................. H04N 25/51 |

FOREIGN PATENT DOCUMENTS

| | | |
|---|---|---|
| JP | 2004-187163 A | 7/2004 |
| JP | 2011-066800 A | 3/2011 |
| JP | 2020-088654 A | 6/2020 |
| JP | 2022-071828 A | 5/2022 |
| JP | 2022-525255 A | 5/2022 |

OTHER PUBLICATIONS

Sep. 10, 2024 Japanese Official Action in Japanese Patent Appln. No. 2022-154904.
Quan Chau et al., Analysis and Modeling of Optical Crosstalk in InP-based Geiger-mode Avalanche Photodiode FPAs, Proceedings of SPIE, IEEE, vol. 9492 (May 13, 2015).
Search Report dated Feb. 9, 2024, in European Patent Application No. 23199071.4.
U.S. Appl. No. 18/368,182, filed Sep. 14, 2023 (First Named Inventor: Aihiko Numata).

* cited by examiner

FIG. 7

| 0%   | 0%   | 0.2% | 0%   | 0%   |
|------|------|------|------|------|
| 0%   | 0.4% | 1%   | 0.4% | 0%   |
| 0.2% | 1%   | 100% | 1%   | 0.2% |
| 0%   | 0.4% | 1%   | 0.4% | 0%   |
| 0%   | 0%   | 0.2% | 0%   | 0%   |

PHOTOELECTRIC CONVERSION APPARATUS, CONTROL METHOD, AND STORAGE MEDIUM

BACKGROUND OF THE INVENTION

Field of the Invention

The present invention relates to a photoelectric conversion apparatus having an avalanche photodiode, and to a control method, a storage medium, and the like.

Description of Related Art

In recent years, photoelectric conversion apparatuses have been proposed that digitally count the number of photons that impinge into an avalanche photodiode (APD), and output the counted value as a digital signal from a pixel.

In photoelectric conversion apparatuses having an APD, it is known that a phenomenon known as avalanche luminescence occurs (I. Rech et al., "Optical crosstalk in single photon avalanche diode arrays: a new complete model", OpEx, 16 (12), 2008). However, in cases in which avalanche luminescence occurs, the resulting secondary electrons become incident on the adjacent pixels, causing the count number for the adjacent pixel value to increase, and erroneous counts to occur.

SUMMARY OF THE INVENTION

The photoelectric conversion apparatus according to one aspect of the present invention comprises:
a photoelectric conversion element including an avalanche photodiode that photoelectrically converts an optical image;
an image generating unit configured to generate a first image based on a signal acquired by the photoelectric conversion element;
an acquisition unit configured to acquire first characteristic information in relation to crosstalk between pixels of the photoelectric conversion element;
a first correction processing unit configured to perform first correction processing for correcting linearity of the first image using the first characteristic information; and
a second correction processing unit configured to perform second correction processing for performing pixel interpolation based on the first characteristic information and information of the first image.

Further features of the present invention will become apparent from the following description of embodiments with reference to the attached drawings.

BRIEF DESCRIPTION OF THE DRAWINGS

FIG. 7 is a diagram showing the probability distribution for the occurrence of erroneous counts between adjacent pixels of a photoelectric conversion element 100 as first array data.

DETAILED DESCRIPTION OF THE INVENTION

Hereinafter, with reference to the accompanying drawings, favorable modes of the present invention will be described using Embodiments. In each diagram, the same reference signs are applied to the same members or elements, and duplicate descriptions will be omitted or simplified.

First Embodiment

Figure 1:
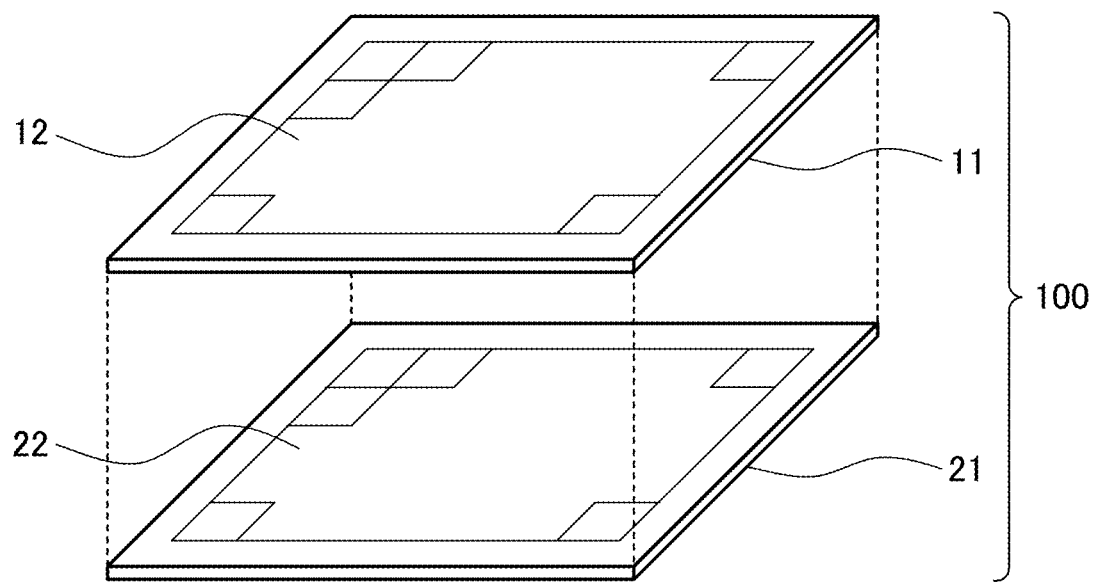
FIG. 1 is a diagram showing a configurational example of a photoelectric conversion element of a First Embodiment.

FIG. 1 is a diagram showing a configurational example of a photoelectric conversion element in the First Embodiment. Below, an explanation is given of an example of a photoelectric conversion apparatus, which is a so-called laminated structure in which a photoelectric conversion element 100 is configured by two boards of a sensor board 11 and a circuit board 21 that are laminated together and electrically connected.

However, the configuration that is included in the sensor board and the configuration that is included in the circuit board may also be so-called un-laminated structures that have been arranged in the same semi-conductor. The sensor board 11 includes a pixel region 12. The circuit board 21 includes a circuit region 22 in which a signal that has been detected in the pixel region 12 is processed.

Figure 2:
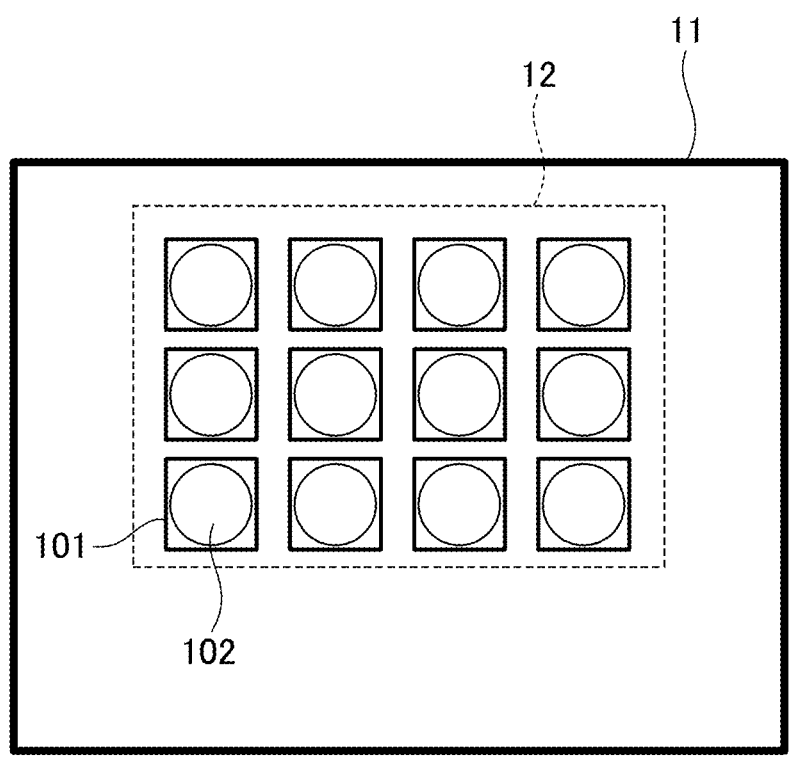
FIG. 2 is a diagram showing a configurational example of a sensor board 11.

FIG. 2 is a diagram showing a configurational example of a sensor board 11. The pixel region 12 of the sensor board 11 includes a plurality of pixels 101 that have been arranged two-dimensionally across a plurality of row and column directions. A pixel 101 is provided with a photoelectric conversion unit 102 that comprises an avalanche photodiode (referred to below as an APD). Note that there are no specific limitations for the number of rows and number of columns for the pixel array that creates the pixel region 12.

Figure 3:
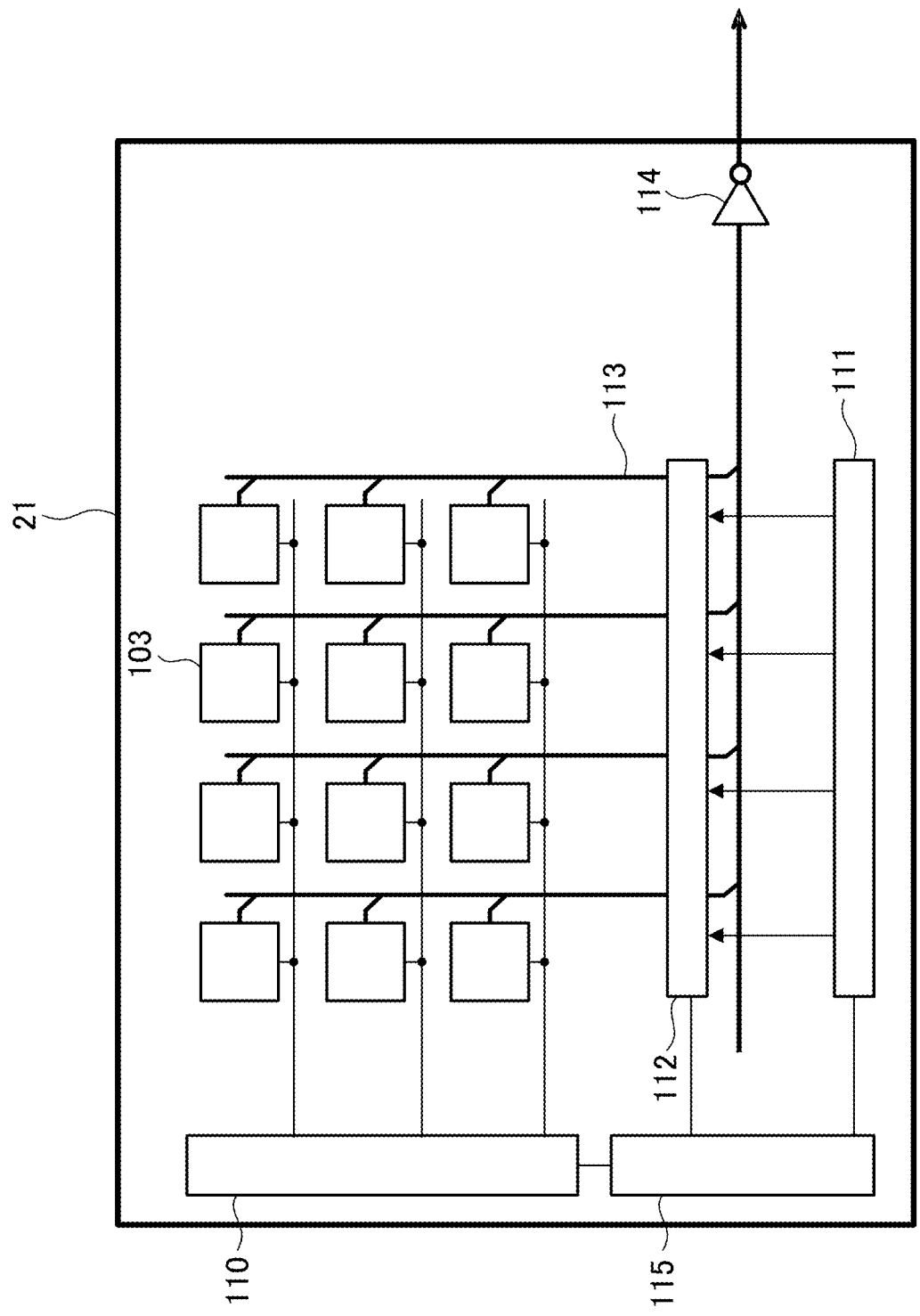
FIG. 3 is a diagram showing a configurational example of a circuit board 21.

FIG. 3 is a diagram showing a configurational example of the circuit board 21. The circuit board 21 has a signal processing circuit 103 that processes an electric signal that has been photoelectrically converted using each photoelectric conversion unit 102 in FIG. 2, a read-out circuit 112, a control pulse generating unit 115, a horizontal scanning circuit 11, a vertical signal line 113, a vertical scanning circuit 110, and an output circuit 114.

The vertical scanning circuit 110 receives a control pulse supplied from the control pulse generating unit 115, and supplies the control pulse to the plurality of pixels that have been arranged in the row direction in order. The vertical scanning circuit 110 uses a logical circuit such as a shift register or an address decoder.

The signals that have been output from the photoelectric conversion units 102 for each pixel are processed in each signal processing circuit 103. The signal processing circuit 103 is provided with a counter, a memory, and the like, and a digital value is held in the memory. In order to read out the signal from the memories for each pixel on which a digital signal has been stored, the horizontal scanning circuit 111 inputs the control pulse that selects each column in order to the signal processing circuit 103.

A signal is output to the vertical signal line 113 from the signal processing circuits 103 for the pixels from a row selected by the vertical scanning circuit 110. The signal that has been output to the vertical signal line 113 is output externally from the photoelectric conversion element 100 via the read-out circuit 112, and the output circuit 114.

As is shown in FIG. 2, and FIG. 3, a plurality of signal processing circuits 103 are arranged in a region that overlaps with the pixel region 12 in the planar view. In addition, the vertical scanning circuit 110, the horizontal scanning circuit 111, the read-out circuit 112, the output circuit 114, and the control pulse generating unit 115 are arranged so as to overlap between the edge of the sensor board 11 and the edge of the pixel region 12 in the planar view.

In other words, the sensor board 11 has the pixel region 12 and a non-pixel region arranged in the periphery of the pixel region 12. In addition, the vertical scanning unit 110, the horizontal scanning unit 11, the read-out circuit 112, the output circuit 114, and the control pulse generating unit 115 are arranged in a region that overlaps with the non-pixel region in the planar view.

Note that the position of the vertical signal line 113 and the positions of the read-out circuit 112 and the output circuit 114 are not limited to the example shown in FIG. 3. For example, the vertical signal line 113 may be arranged to extend in the row direction, and the read-out circuit 112 may also be arranged in the direction in which the vertical signal line 113 extends. Conversely, the signal processing circuit 103 does not necessarily need to be provided such that there is one per each of the photoelectric conversion units, and a configuration may also be employed in which one signal processing circuit is shared by a plurality of photoelectric conversion units, and signal processing is performed in order.

Figure 4:
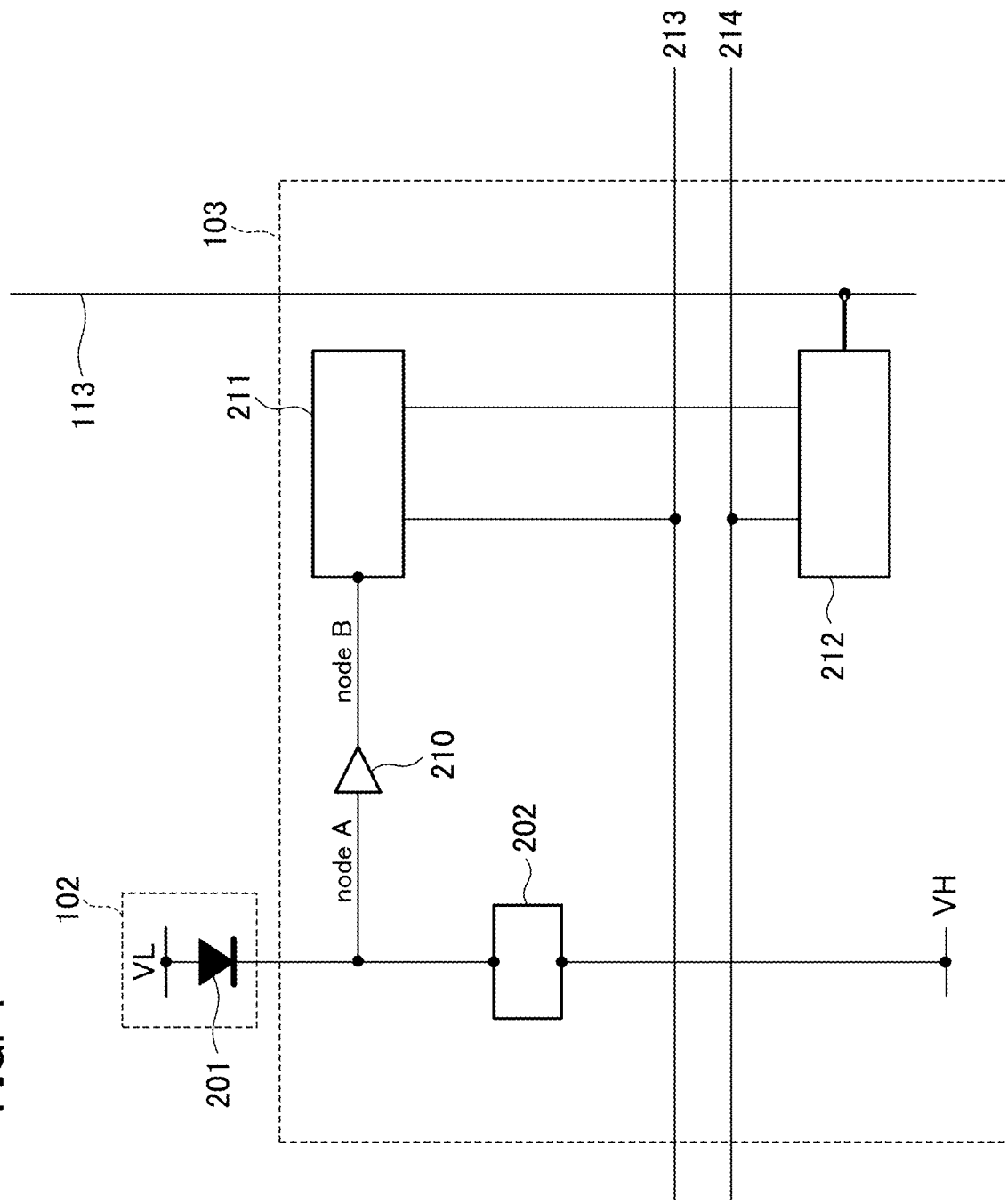
FIG. 4 is a diagram showing from among FIG. 2 and FIG. 3, a pixel 101, and an equivalent circuit for a signal processing circuit 103 corresponding to the pixel 101.

FIG. 4 is a diagram showing a pixel 101 and an equivalent circuit for the signal processing circuit 103 corresponding to the pixel 101 in FIG. 2, and FIG. 3.

An APD 201 that is included in the photoelectric conversion unit 102 generates a charge pair corresponding to incident light from the photoelectric conversion. One of the nodes from among the two nodes of the APD 201 is connected to a power supply line that supplies a drive voltage VL (a first voltage). In addition, the other node from among the two nodes of the APD 201 is connected to a power supply line that supplies a drive voltage VH (a second voltage) that is higher than the voltage VL.

In FIG. 4, the first node of the APD 201 is an anode, and the other node of the APD 201 is a cathode. The anode and cathode of the APD 201 are supplied with reverse bias voltages such that the APD 201 performs an avalanche multiplication operation. By making this a state in which such a voltage has been supplied, the electric charge that has been caused by the incident light causes avalanche multiplication, and an avalanche current is generated.

Note that in a case in which a reverse bias voltage is supplied, there is a Geiger mode that is made to operate at a difference in voltages in which the difference in voltages for the anode and cathode is larger than the breakdown voltage, and a linear mode that is made to operate at a difference in voltages in which the voltage difference between the anode and the cathode is in the vicinity of or less than the breakdown voltage. The APD that is made to operate in the Geiger mode is called an SPAD. In the case of the SPAD, for example, the voltage VL (the first voltage) is −30V, and the voltage VH (the second voltage) is 1V.

The signal processing circuit 103 has a quench element 202, a waveform shaping unit 210, a counter circuit 211, and a selection circuit 212. The quench element 202 is connected to the power supply line from which the drive voltage VH is supplied and one node from among the anode and cathode of the APD 201.

The quench element 202 functions as a load circuit (a quenching circuit) at the time of signal amplification due to the avalanche multiplication, and has a function for controlling the voltage that is supplied to the APD 201, and controlling the avalanche multiplication (a quenching function). In addition, the quench element 202 has a function that returns the voltage that is supplied to the APD 201 to the drive voltage VH by sending an electric current for the portion that was voltage dropped by the quenching function (a recharging function).

In FIG. 4, an example has been shown in which the signal processing circuit 103 has the waveform shaping unit 210, the counter circuit 211, and the selection circuit 212 in addition to the quench element 202. However, it is sufficient if the signal processing circuit 103 has at least one of the waveform shaping unit 210, the counter circuit 211, and the selection circuit 212 in addition to the quench element 202.

The waveform shaping unit 210 shapes voltage changes in the cathode of the APD 201 that are obtained at the time of photon detection, and outputs a pulse signal. For example, an inverter circuit is used as the waveform shaping unit 210. In FIG. 4, an example has been shown in which one inverter is used as the waveform shaping unit 210. However, a circuit in which a plurality of inverters has been serially connected may also be used, or another circuit having a waveform shaping effect may also be used.

The counter circuit 211 counts the pulse signals that have been output from the waveform shaping unit 210, and holds a count value. In addition, when a control pulse RES has been supplied via the drive line 213, the signal that has been held in the counter circuit 211 is reset.

The selection circuit 212 is provided with a control pulse SEL from the vertical scanning circuit 110 of FIG. 3 via the drive line 214 of FIG. 4 (not shown in FIG. 3), and switches between electric connection and dis-connection with the counter circuit 211 and the vertical signal line 113. For example, the selection unit 212 includes a buffer circuit for outputting a signal, and the like, and outputs an output signal from the counter circuit 211 of the pixel to the vertical signal line 113.

Note that a switch such as a transistor or the like may also be arranged between the quench element 202 and the APD 201, and between the photoelectric conversion unit 102 and the signal processing circuit 103, and electric connection may be switched on and off. In the same manner, the supply of the voltage VH or the voltage VL that are supplied to the photoelectric conversion unit 102 may also be electrically switched on and off using a switch such as a transistor or the like.

Figure 5:
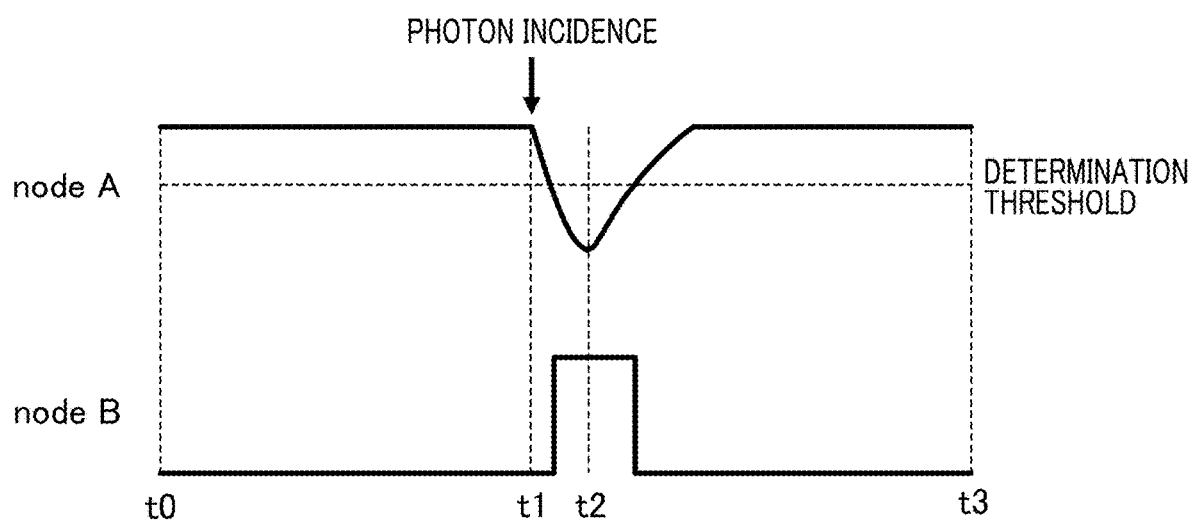
FIG. 5 is a diagram that schematically shows the relationship between the functions of an APD 201 and an output signal.

FIG. 5 is a diagram schematically showing the relationship between the operations of the APD 201 and the output signal. The input side of the waveform shaping unit 210 is made nodeA, and the output side is made nodeB. In between the time period t0 and the time period t1, a potential difference VH-VL is applied to the APD 201. Upon the photons becoming incident on the AD 201 during the time period t1, avalanche multiplication occurs in the APD 201, an avalanche multiplication current flows through the quench element 202, and the voltage of the nodeA is dropped.

If the voltage drop amount further increases, and the potential difference that is applied to the APD 201 becomes small, the avalanche multiplication of the APD 201 stops as during the time period t2, and the voltage level for the nodeA drops below a specific, predetermined value.

After this, between the time period t2, and the time period t3, an electric current that corrects the voltage drop portion flows through the nodeA from the voltage VL, and during the time period t3, the nodeA is statically determined at the original potential level, at this time, the portion in the nodeA for which the output waveform has exceeded a certain threshold is waveform shaped by the waveform shaping unit 210, and is output as a pulse signal from the nodeB.

Figure 6:
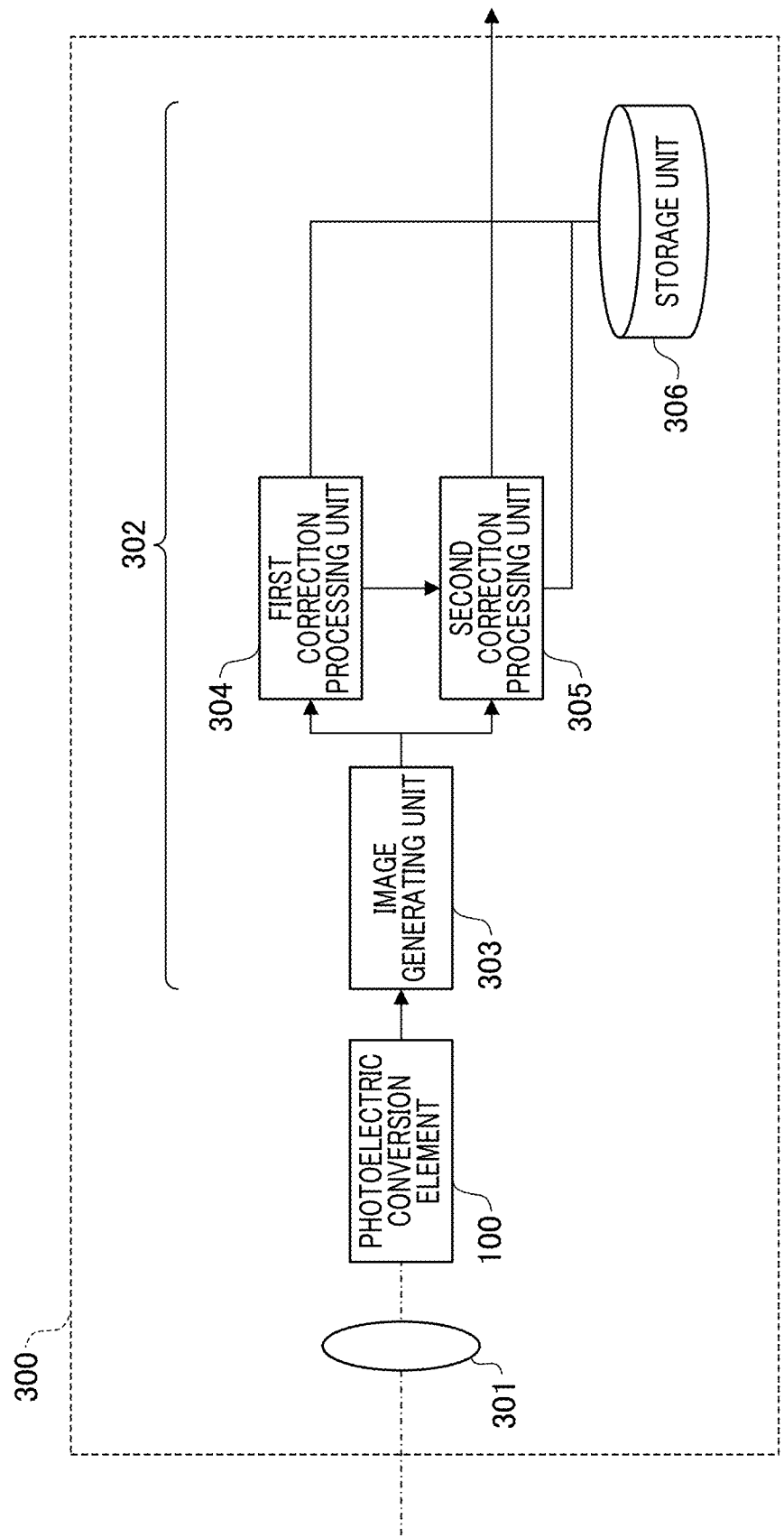
FIG. 6 is a functional block diagram of a photoelectric conversion apparatus 300 according to the First Embodiment.

Below, an explanation is given with respect to the photoelectric conversion apparatus 300 of the First Embodiment. FIG. 6 is a functional block diagram of the photoelectric conversion apparatus 300 according to the First Embodiment. A portion of the functional blocks that are shown in FIG. 6 are realized by a computer, which is not shown, but is included in the photoelectric conversion apparatus 300, executing a computer program that has been stored in a memory serving as a storage medium, which is also not shown.

However, a portion or the entirety thereof may also be made so as to be realized by hardware. An Application Specific Integrated Circuit (ASIC) and a processor (a reconfigurable processor, a DSP), and the like can be used as this hardware. In addition, each of the functional blocks that are shown in FIG. 6 do not need to be built into the same body, and they may also be configured by separate apparatuses that have been connected to each other via a signal path. Note that the above explanation in relation to FIG. 6 is applicable to FIG. 18 in the same manner.

The photoelectric conversion apparatus 300 has the photoelectric conversion element 100 that was explained in FIG. 1 to FIG. 5, an image forming optical system 301, and a signal processing unit 302 that processes an image signal acquired by the photoelectric conversion element 100. The photoelectric conversion element 100 is configured by an avalanche photodiode for photoelectrically converting an optical image. Note that in the First Embodiment, an explanation is given for a case in which each pixel in the photoelectric conversion element 100 does not have a color filter, and is a so-called monochrome sensor.

The signal processing unit 302 has an image generating unit 303 that generates a first image from the image signal acquired by the photoelectric conversion unit, a first correction processing unit 304, and a second correction processing unit 305. In addition, the signal processing unit 302 has a storage unit 306 that stores first array data in relation to first characteristic information for the photoelectric conversion element 100.

Note that the above first characteristic information is information in relation to crosstalk characteristics between pixels that are caused by an avalanche luminescence phenomenon of the photoelectric conversion element 100. Note that the storage unit 306 may also download and temporarily save the first characteristic information (first array data and the like) from an external server or the like.

In addition, the linearity of the first image is corrected by erroneous count correction (the first correction processing) being performed using the first characteristic information (first array data and the like) of the photoelectric conversion element 100 in the first correction processing unit.

In addition, second correction processing for pixel interpolation (defect correction processing) of the signal for the pixels that are defects is performed in the second correction processing unit using the first image information and the information from the first characteristic information (first array data and the like) of the photoelectric conversion element 100. Note that the first characteristic information in relation to the crosstalk characteristics between pixels that is caused by an avalanche luminescence phenomenon of the photoelectric conversion element may be array information or it may also be a function.

Figure 7:
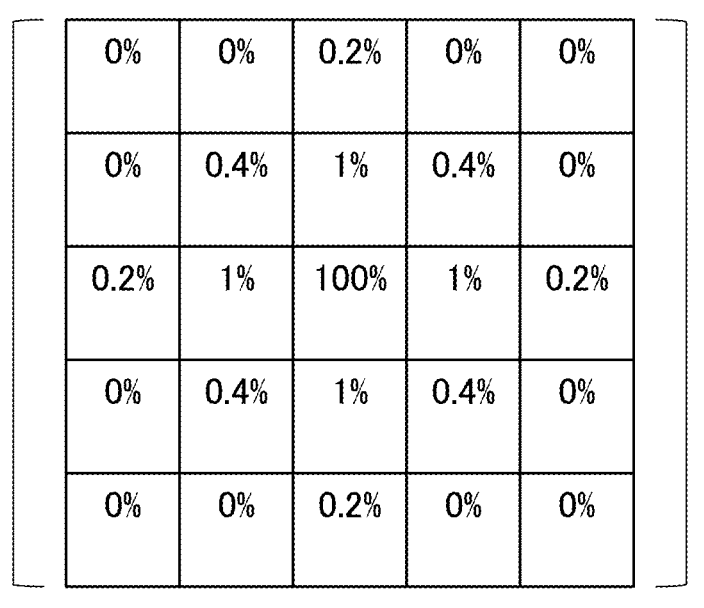

FIG. 7 is a diagram that shows the probability distribution of an erroneous count occurring between adjacent pixels of the photoelectric conversion element 100 as the first array data, and shows an example of the first array data corresponding to the first characteristic information of the photoelectric conversion element 100.

First array data (first characteristic information) such as that shown in FIG. 7 is stored in the storage unit 306, and correction is performed in the first correction processing unit 304 and the second correction processing unit 305 using this first array data.

Note that the first array data or the like that serves as the first characteristic information may be data that is stored in the storage unit 306 or the like as a table, or it may also be held as a function.

As is shown in non-patent publication 1, in a case in which the pixels are avalanche photodiodes, erroneous counts between adjacent pixels, that is, crosstalk between adjacent pixels (referred to below as luminescent crosstalk), occurs due to the avalanche luminescence phenomenon.

The effects on an adjacent pixel of photons that have become incident on one pixel are determined using the probability of luminescent crosstalk occurring. In addition, the probability of luminescent crosstalk occuring is determined by the pixel structure of the photoelectric conversion element, and therefore, it is possible to predict the probability of luminescent crosstalk occurring from the pixel structure of the photoelectric conversion element.

Therefore, the image quality is improved by performing signal processing that suppresses the effects of erroneous counts using the information for the probability of luminescent crosstalk occuring in the photoelectric conversion apparatus 300 in the First Embodiment.

Figure 8:
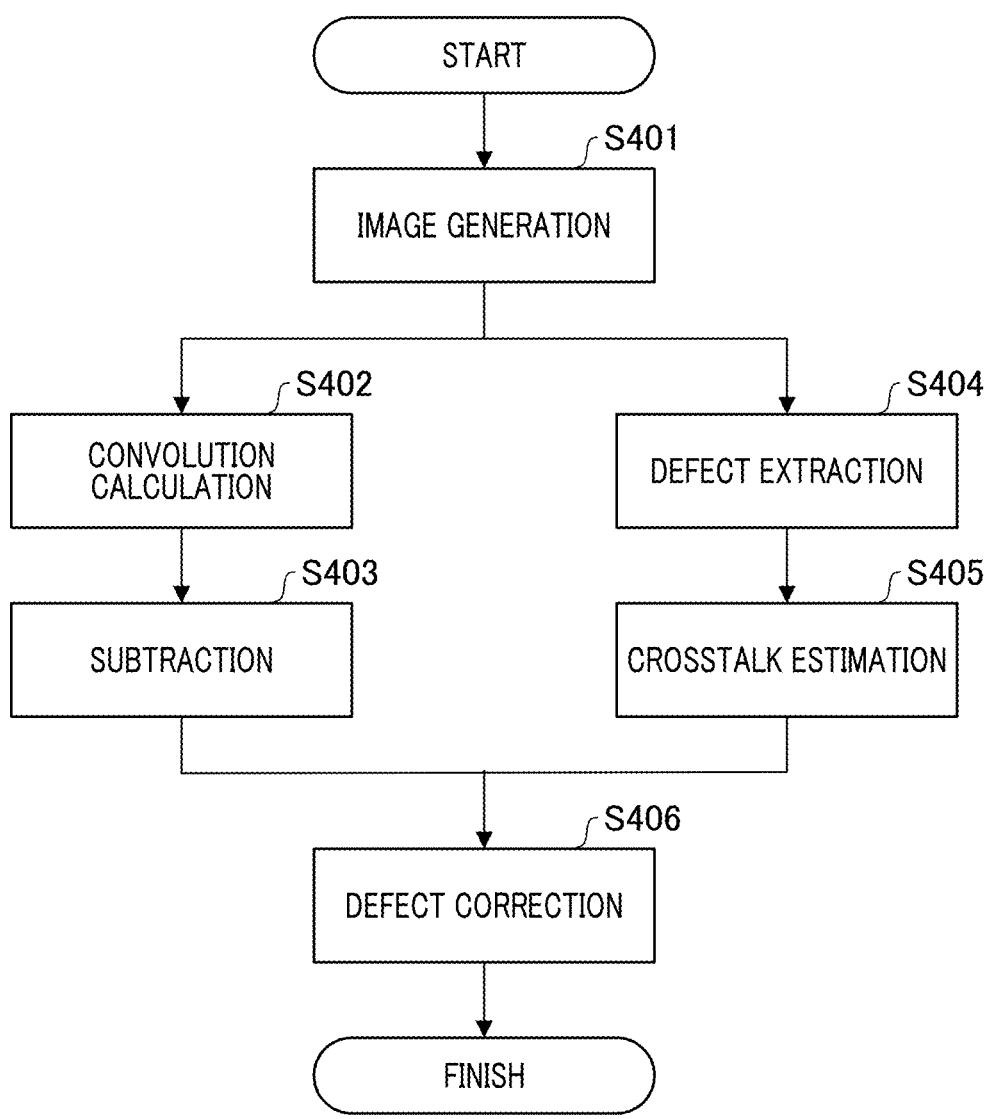
FIG. 8 is a flowchart relating to signal processing for a photoelectric conversion apparatus according to the First Embodiment.

FIG. 8 is a flowchart relating to signal processing of the photoelectric conversion apparatus according to the First Embodiment. Note that the operations for each step of the control method of the photoelectric conversion apparatus that is shown by the flowchart of FIG. 8 are performed by the computer inside of the photoelectric conversion apparatus 300 executing a computer program that has been stored in a memory.

First, during step S401 (an image generating step), a first image is generated by the image generating unit 303 based on a signal acquired by the photoelectric conversion element 100. After this, the processing bifurcates into the first correction processing and the second correction processing.

First, the first correction processing will be explained. During step S402, convolution calculation is executed in order to convolute second array data created based on the first array data in the first correction processing unit 304 in relation to the first image that was generated by the image generating unit 303, and a second image is generated.

As has been explained above, it is possible to predict the probability of luminescent crosstalk occurring, and therefore, by executing convolution calculation, the second image becomes a signal that shows the erroneous counts that have been caused by luminescent crosstalk.

Note that the first characteristic information (the first array data or the like) can be acquired from the storage unit 306, or an external server or the like. In addition, the second array data may also be stored on the storage unit 306 or the like as a table or a function. In this context, step S402 functions as an acquisition step (an acquisition unit) in which the first characteristic information for the photoelectric conversion element is acquired.

Next, during step S403, the second image is subtracted from the first image, and a third image is generated in the first correction processing unit 304. As was explained above, the second image has become a signal showing erroneous counts that have occurred due to luminescent crosstalk, and therefore, the third image is an image in which the signal that could have been obtained in a case in which erroneous counts due to luminescent crosstalk did not occur has been restored.

Note that, in this context, step S402 and step S403 function as a first correction processing step (a first correction processing unit) in which first correction processing for correcting the linearity of the first image is performed using the first array data.

Figure 9:
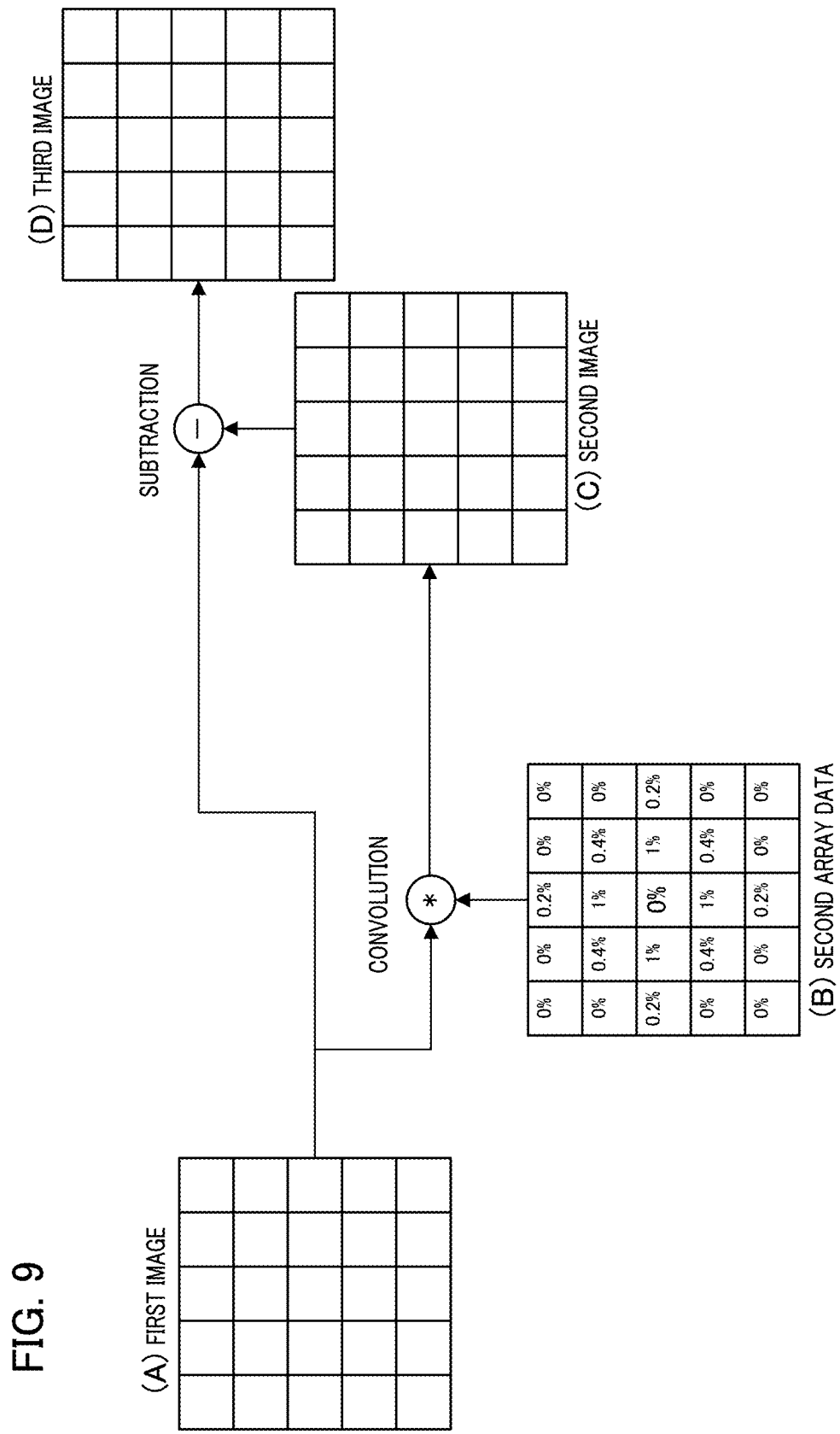
FIG. 9 is a diagram explaining first correction processing according to the First Embodiment.

FIG. 9 is a diagram explaining the first correction processing according to the First Embodiment, wherein (A) shows the first image, (B) shows the second array data, (C) shows the second image, and (D) shows the third image. The second array data that is used during step S402 uses data in which, in relation to the first array data in FIG. 7, the value for this pixel has been made 0.

However, if the second array data was made based on the first array data, it may also be different from (B). Note that during step S402, the area may also be obtained after having Fourier transformed the first image and the second array data, instead of performing convolution calculation. That is, it is sufficient if the first correction processing is processing in which the results of a predetermined calculation (convolution calculation, or a Fourier calculation and multiplication, or the like) using the first characteristic information for the photoelectric conversion apparatus and the first image, are subtracted from the first image.

Next, the second correction processing will be explained. Correction of defect pixels is executed in the second correction processing unit. As was explained above, in a case in which the pixel is an avalanche photodiode, the effects of defect pixels are spread to the surrounding pixels by luminescent crosstalk.

Such defects are called cluster defects. The quality of the image is increased by performing signal processing in the second correction processing unit that suppresses erroneous counts due to cluster defects by using information for the probability of luminescent crosstalk occuring.

Figure 10:
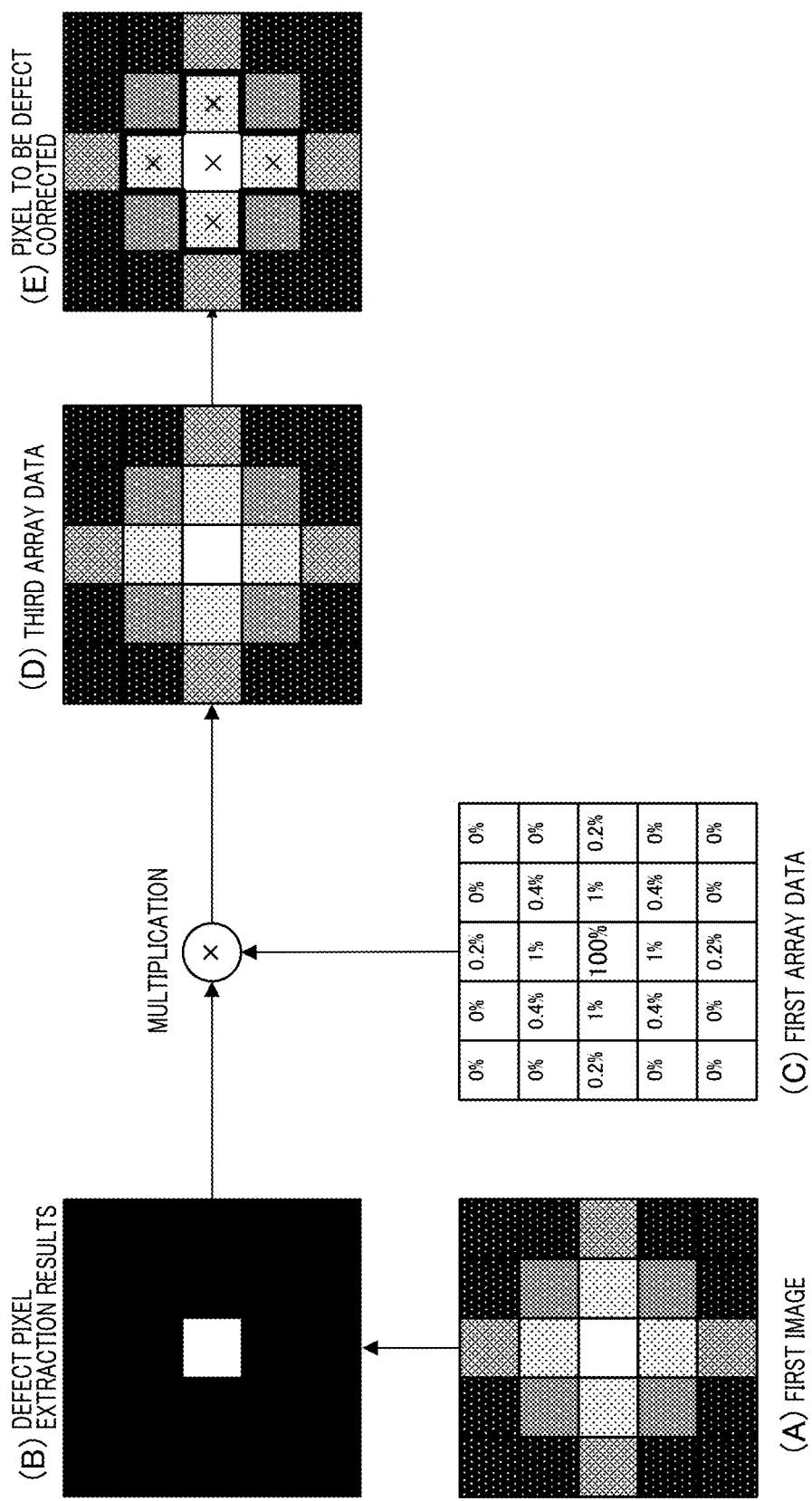
FIG. 10 is a diagram explaining second correction processing according to the First Embodiment.

First, in step S404, pixels for which the detection level is higher than that for the surrounding pixels are extracted as defect pixels from the first image that was generated by the image generating unit 303. FIG. 10 is a diagram explaining the second correction processing according to the First Embodiment.

In FIG. 10, (A) shows the first image, and (B) shows the extraction results for the defect pixels that were extracted during step S404. A dark image is captured in advance, and the position and output level of pixels with an output at or above a predetermined threshold are stored in a memory such as the storage unit 306 or the like as address data of the defect pixel.

During step S405, crosstalk estimation is performed. That is, third array data is generated based on an output value for the defect pixels and the first array data with respect to each of the defect pixels. The third array data is array data in which to what extent the pixels surrounding the defect pixels that have been extracted are affected by the crosstalk from the defect pixels has been estimated.

Specifically, it is possible to generate third array data in which the effects of crosstalk have been estimated by multiplying the level of the defect pixels that have been extracted from the first image (an output value for the first image) and the first array data. Note that if the third array data is array data that was created based on the first image and the first array data, it is not limited thereto. In FIG. 10, (C) shows the first array data and (D) shows the third array data.

Next, during step S406, a fourth image is generated by performing defect correction on the pixels in which it has been estimated that the value for the third array data generated in relation to each of the defect pixels (the crosstalk estimation amount) is at or above a predetermined first threshold.

In this manner, step S404 to step S406 function as a second correction processing step (a second correction processing unit) in which second correction processing is performed in order to perform pixel interpolation based on both the first array data and the first image information. In FIG. 10 (E), pixels in which the crosstalk estimation amount is at or over the first threshold (pixels that will be the subject of defect correction) are shown as being marked with an X mark.

Specifically, processing is executed that interpolates the output values for pixels from among the values for the third array data that are at or over the first threshold using the output values for a plurality of surrounding pixels for which the third array data are less than the first threshold in relation to the third image that was generated during step S403. That is, the third image output values are corrected based on the third array data.

As the interpolation processing it is sufficient if a median filter is applied to the surroundings of the pixels that will be the subject of interpolation excluding the pixels for which the third array data is at or above the first threshold.

It is sufficient if the kernel size for the median filter is at or above 3×3, however, it is possible that the effects of the defect pixel will spread to the surrounding pixels due to the effects of cluster defects, and therefore, it is preferable if the kernel size is at or above 5×5.

In addition, the size of the median filter may also be changed according to the ratio of pixels for which the estimated crosstalk amount in the surroundings of the pixel that will be the subject of interpolation is at or above the first threshold. That is, by increasing the kernel size the larger the ratio of pixels for which the third array data in the surroundings of the pixel to be interpolated is at or above the first threshold is, it is possible to increase the pixels that can be used in the correction (the pixels in which the third data array is less than the first threshold), and the precision of the interpolation can be increased.

Note that instead of a median filter, a bilateral filter, a Gaussian filter, or the like may also be used. Note that as is shown in FIG. 7, the first array data that serves as the first characteristic information may be one dimensional, or it may be two dimensional, as long as it includes two or more datums. However, a two-dimensional array data is preferable.

Furthermore, upon taking into consideration the symmetry of the probability of crosstalk, it is preferrable if this is a matrix of an odd number of both rows and columns that is symmetrical top to bottom and left to right centered on the center. The value for the probability of crosstalk becomes larger the closer it is to this pixel and therefore, the crosstalk matrix has a peak value in the center, and has a distribution that monotonically changes towards both of the edges.

Specifically, upon retrieving one row or one column of the crosstalk matrix, which is two-dimensional array data, as one-dimensional data, this has a distribution that monotonically decreases towards both of the data edges from the peak value at its center.

That is, one dimensional data corresponding to at least one row or at least one column of the two-dimensional array data has a peak value at its center. In addition, the peak value of the retrieved one-dimensional data is shared, and the other one dimensional data arranged in a direction that intersects this one dimensional data also has a distribution that monotonically decreases towards the data edges from the peak value.

Note that in FIG. 8, an example has been explained in which during step S404, defects are extracted using address data that has been stored in a memory in advance. However, the defect pixels and the output levels therefor may also be extracted from the first image. Specifically, a fifth image is generated by applying a median filter to the first image.

In addition, the pixels for which the difference between the first image and the fifth image is at or above a second threshold are extracted as the defect pixels, and the difference between the first image and the fifth image is made the output level for the defect pixels. That is, it is sufficient if the defect pixels are extracted by comparing the pixel outputs for each pixel of the first image and the surrounding pixels thereof.

Extracting the defect pixels and the output levels therefor from the first image requires less memory for storing the defect addresses than by using address data, and therefore, this simplifies the configuration of the photoelectric conversion apparatus 300 and is preferable.

In contrast, in a case in which the defect pixels are extracted from the first image using a median filter, if a subject such as a luminous dot is image captured, it is possible that there will be erroneous detections of defect pixels. Therefore, in order to extract defect pixels and the output level thereof with a high precision, it is preferable to use address data. Note that above, an example has been given for a case in which a median filter is used. However, the defect pixels may also be extracted by comparing the output value for this pixel and the average output value for the surrounding pixels.

In this manner, in a case in which the pixels to be corrected by the second correction processing are extracted using the first image, step S404 and step S405 may also be integrated. That is, a sixth image is generated in which in each pixel of the first image, the fifth image in which a median filter has been applied has been subtracted from the first image.

In addition, it is sufficient if processing is executed that obtains the third data by multiplying each pixel of the sixth image and the first array data, then performs interpolation on at least one or more pixels for which the third array data is at or above the first threshold using a plurality of pixels for which the third array data is at or below the first threshold. The reasoning therefor will be explained below.

As was explained above, the value for the probability of crosstalk becomes larger the closer a surrounding pixel is to this pixel. In addition, the third array data is array data that shows to what extent the pixels surrounding the extracted defect pixel are affected by crosstalk from the defect pixel. Therefore, in the third array data, the value for this pixel is larger than the values for the surrounding pixels.

Therefore, if the pixels in the third array data that are at or above the first threshold are made the pixels to be interpolated, this pixel will also become a pixel to be interpolated. In this manner, in a case in which the pixel to be corrected for the second correction processing is extracted using the first image, if step S404 and step S405 are integrated, the defect extraction step in step S404 becomes unnecessary, and the circuit scale for the correction processing is reduced, making this preferable.

In this manner, in the photoelectric conversion apparatus of the First Embodiment, erroneous counts in adjacent pixels caused by an avalanche luminescence phenomenon are suppressed by the first correction processing. Furthermore, the quality of the image is increased by using the second correction processing to suppress, in particular, from among the same erroneous counts in adjacent pixels caused by the avalanche luminescence phenomenon, erroneous counts that are caused by cluster defects.

In contrast, even if only the first correction processing is executed without performing the second correction processing, it is possible to suppress erroneous counts caused by cluster defects. However, it is possible to further suppress erroneous counts caused by cluster defects by executing the second correction processing, and this is therefore preferable. The reasoning for this will be explained below.

First, a case in which only the first correction processing has been performed will be explained. As was described above, it is possible to predict the probability of occurrence of luminescent crosstalk from the pixel structure of the photoelectric conversion element. However, due to structural inconsistencies or the like, it is not necessarily the case that the probability of occurrence of luminescent crosstalk will be the same probability across all of the pixels. Therefore, there are cases in which the effectiveness of the correction processing for the first correction processing is not sufficient due to structural inconsistencies.

In a case of, for example, pixels for which the difference in the output levels for the surrounding pixels is small, the effects on the surrounding pixels due to this pixel at the time the convolution calculation, and the effects of the surrounding pixels on this pixel are of the same extent, and therefore, the effect due to structural inconsistencies is low, and the effectiveness of the correction processing barely decreases.

In contrast, the pixels for which the output level is high in relation to the surrounding pixels, that is, the defect pixels that will cause defect clusters, have a large effect on the surrounding pixels at the time of the convolution calculation, and therefore, there are cases in which the effect due to structural inconsistencies is large, and the effectiveness of the correction processing is not sufficient.

That is, the probability of luminescent crosstalk that is used during the convolution calculation is higher than that for the luminescent crosstalk that is actually occurring in pixels for which the probability of occurrence for luminescent crosstalk is low, and therefore, blackening occurs in the pixels surrounding the cluster defects.

In contrast, the probability of luminescent crosstalk that is used at the time of the convolution calculation is lower than the luminescent crosstalk that is actually occurring in pixels for which the probability of the occurrence of luminescent crosstalk is high, and therefore, defects remain in the pixels surrounding the cluster defects.

In this context, in the photoelectric conversion apparatus of the First Embodiment, the erroneous counts due to cluster defects that cannot be fully corrected during the first correction processing are corrected using the second correction processing.

During the second correction processing, the pixels for which the estimated amount of crosstalk is large, that is, the pixels that are cluster defects, are corrected using interpolation processing. Therefore, it is possible to sufficiently decrease the effect on the surrounding pixels of the difference in the probability of luminescent crosstalk caused by structural inconsistencies in relation to the convolution calculation that was used in the first correction processing.

Note that in a case in which only the second correction processing has been performed, it is not possible to suppress of erroneous counts other than those for the defect pixels. That is, by executing both the first correction processing and the second correction processing, it is possible to suppress erroneous counts, and to increase the quality of the image.

In FIG. 8, during step S406, defect correction was performed with respect to pixels for which the third array data was at or above the first threshold. However, whether or not to execute defect detection may also be determined using the size of the second array data that is used in the first correction processing instead of the third array data.

As has been explained above, pixels that have a high output level in relation to the surrounding pixels have a large effect on the surrounding pixels due to the convolution calculation of the first correction processing. Therefore, if the size of the second array data that is used in the first correction processing is made N×M, the N×M pixels surrounding the cluster defects are pixels for which it is possible that blackening or left over defects will occur due to structural inconsistencies.

In this context, during step S405, it is preferable that the pixels for N and above×M and above surrounding the defect pixels that were executing during step S403 are made the pixels to be defect corrected. That is, it is preferrable to make the size of the scope of the pixels that will be defect corrected by the second correction processing larger than the size of the second array data.

Second Embodiment

An explanation will be given for a case in which the photoelectric conversion apparatus according to the Second Embodiment is a so-called color sensor in which the photoelectric conversion element has a plurality of pixels with different spectral characteristics in relation to the photoelectric conversion apparatus according to the First Embodiment. Below, an explanation will be given using a color sensor of an RGGB Bayer array type as an example.

That is, for each pixel, one of an R, G, or B color filter is disposed in front of the pixel, and for example, color filters are disposed in the order of R, G, R, G for a predetermined row, and color filters are disposed in the order of G, B, G, B in the adjacent row.

Figure 11:
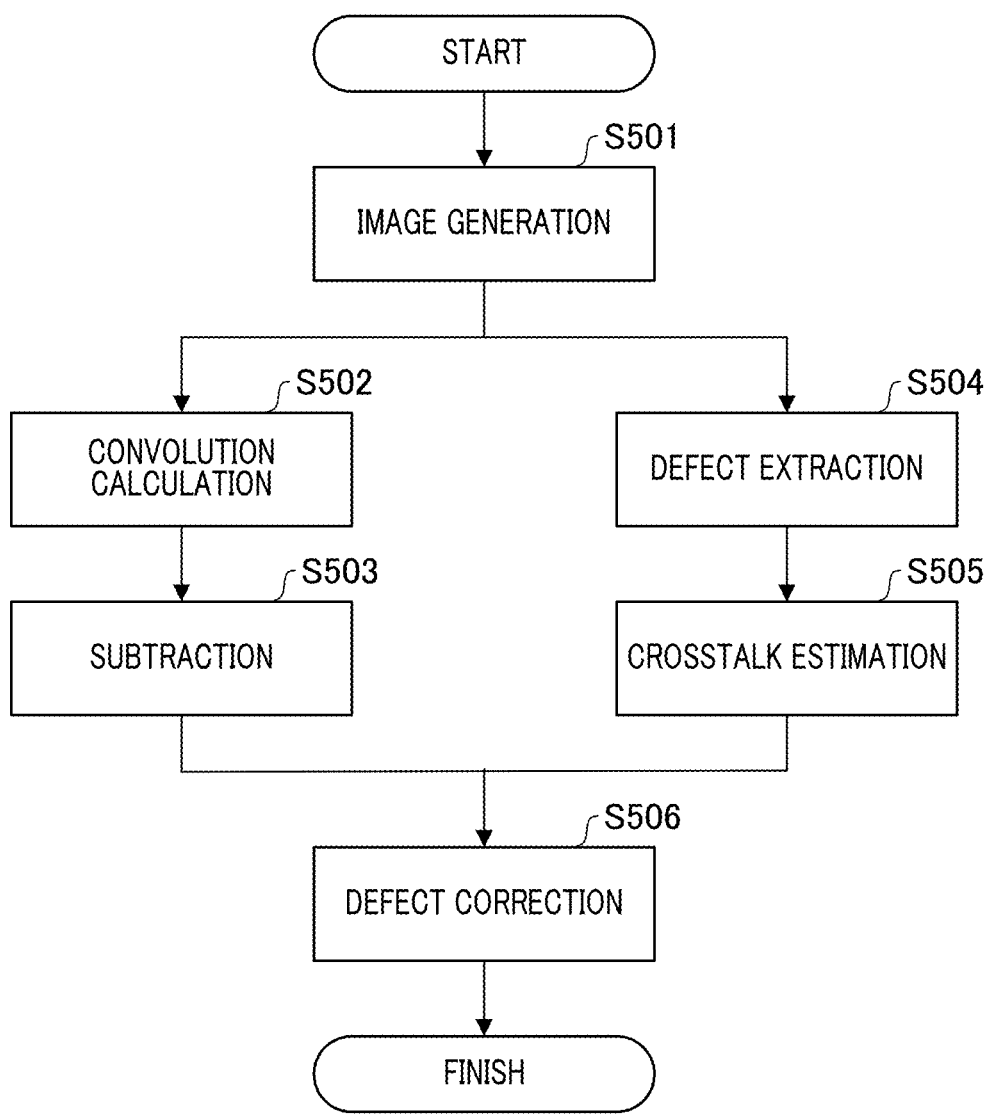
FIG. 11 is a flowchart for signal processing of a photelectric conversion apparatus according to a Second Embodiment.

FIG. 11 is a flowchart for the signal processing for the photoelectric conversion apparatus according to the Second Embodiment. Note that the operations for each step of the flowchart in FIG. 11 are performed by the computer inside of the photoelectric conversion apparatus 300 executing a computer program stored in a memory.

Below, an explanation will be given that concentrates on the portions that are different from the flowchart in FIG. 8. During step S501, a first image is generated by the image generating unit 303 in the same manner as in step S401. After this, the processing also bifurcates into first correction processing and second correction processing in the same manner as in FIG. 8.

After this bifurcation, step S502 (convolution calculation), and step S503 (subtraction), which execute the first correction processing, are the same as FIG. 8. The probability of luminescent crosstalk is determined by the structure within the substrate that is formed by the avalanche photodiodes, and the effects of the color filters that have been disposed on the substrate can be ignored.

Therefore, the probability of luminescent crosstalk occurring is similar in both the monochrome sensor according to the First Embodiment and the color sensor according to the Second Embodiment, and it is sufficient if the first correction processing is executed using the same correction.

In the same manner, step S504 and step S505 are the same as FIG. 8. In a case in which defect addresses that were stored in a memory are used during step S504, there is no difference between a monochrome sensor and a color sensor, and it is also possible to ignore the effects of the color filter on the third array data that is used during step S505.

However, the interpolation of the defects in step S506 is different than step S406. Specifically, during step S506, interpolation processing is performed for each pixel with different spectral characteristics, that is, using signals from the pixels of the same color (spectral characteristics). Specifically, it is sufficient if a median filter is applied to each pixel with different spectral characteristics excluding the pixels in the surroundings of the pixel to be interpolated for which the third array data is at or above the first threshold.

In the case of a Bayer array color sensor, pixels with the same color (spectral characteristics) are disposed at an interval of one pixel in each row and each column, and therefore, if these are limited to pixels having the same spectral characteristics, the effects of the cluster defects are reduced more than when a monochrome sensor is used. Therefore, it is sufficient if the kernel size for the median filter is 3×3 or larger.

Note that during step S504, in a case in which the defect pixels are extracted from the first image without using defect addresses that have been stored, the defect extraction during step S504 of the second correction processing will also differ from step S404.

Figure 12:
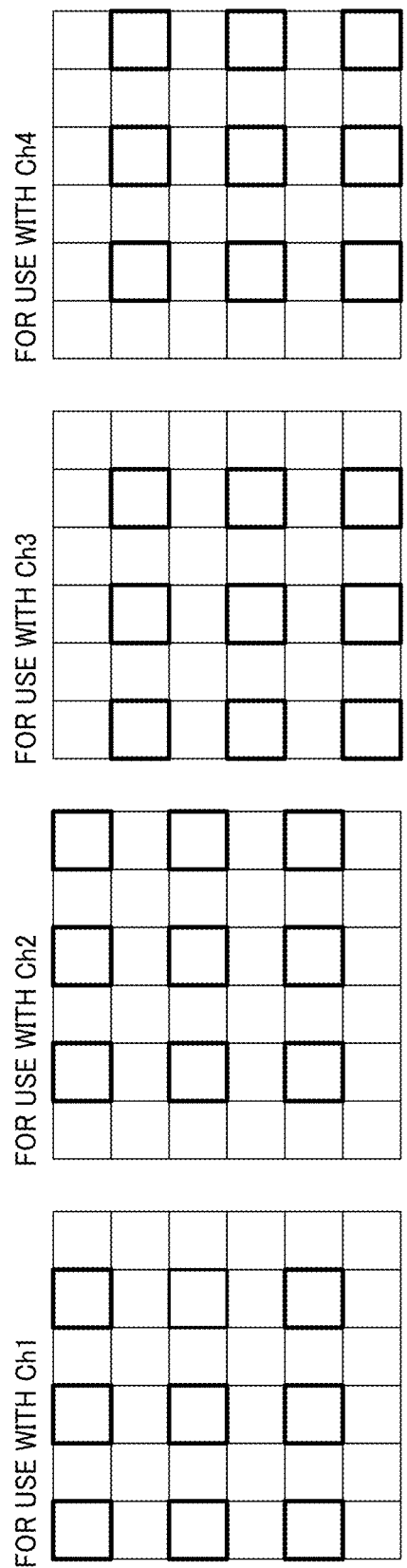
FIG. 12 is a diagram explaining second correction processing according to the Second Embodiment.

FIG. 12 is a diagram explaining the second correction processing according to the Second Embodiment, and as is shown in FIG. 12, seventh images (4 types) are generated in which a median filter has been applied to each pixel with different spectral characteristics (between pixels having the same characteristics) in relation to the first image. Note that in FIG. 12, each of Ch1, Ch2, Ch3, and Ch4 show, for example, the R, G, G, and B pixels.

In addition, the pixels for which the difference between the first image and the seventh image is at or above the second threshold are extracted as the defect pixels, and the difference between the first image and the second image is made the output level for the defect pixels. Note that although in FIG. 12 the kernel size of the median filter has been made 3×3, it may also be larger than this size. In this manner, it may be made such that the defect pixels are extracted by comparing the outputs for each pixel and its surrounding pixels for every pixel with different spectral characteristics using the first image.

In the same manner, in a case in which step S504 and step S505 are integrated as well, they differ from step S404, and step S405. Specifically, in the same manner as in FIG. 12, seventh images are generated in which a median filter has been applied to each pixel with different spectral characteristics, and eighth images are generated in which the seventh images have been subtracted from the first image.

In addition, the third array data is obtained by calculating the signal level for each pixel in the eighth images, and the area of the first array data. Furthermore, it is sufficient if interpolation processing is executed on the output values of the pixels for which the third array data is at or above the first threshold using the output values for a plurality of pixels for which the third data array data is less than the first threshold, for every color.

In addition, in the case of a color sensor, the second array data that is used in the convolution calculation during step S502 may also be changed for each color. In the same manner, the third array data that is used during step S504 may also be changed for each color.

In the case of a color sensor, although there is no difference in the probability of crosstalk between colors, the signal levels for each pixel of a different color will change based on the color of the subject, and therefore, there are colors that are easily affected by erroneous counts due to crosstalk.

For example, in a case of in which the photoelectric conversion element is a color sensor with an RGGB Bayer array, in general subjects, the luminance value for B pixels is the smallest, and the luminance for G pixels is the largest. Therefore, B pixels are the easiest to be affected by erroneous counts due to crosstalk, and G pixels are the most difficult to be affected.

Although it is possible to decrease the influence of erroneous counts due to crosstalk the larger the size of the second array data is, it becomes easy for this to be affected by differences in the probability of luminescent crosstalk due to structural inconsistencies. Therefore, it is desirable to make the second array data the smallest size in which the influence of erroneous counts due to crosstalk can be suppressed.

Therefore, the size of the second array data may also be made to be different for each pixel with different spectral characteristics. For example, in a case in a which the photoelectric conversion element is a color sensor using an RGB color filter, it is preferable if the size of the second array data that is used during step S502 is made larger for the B pixels than for the G pixels.

Third Embodiment

Figure 13:
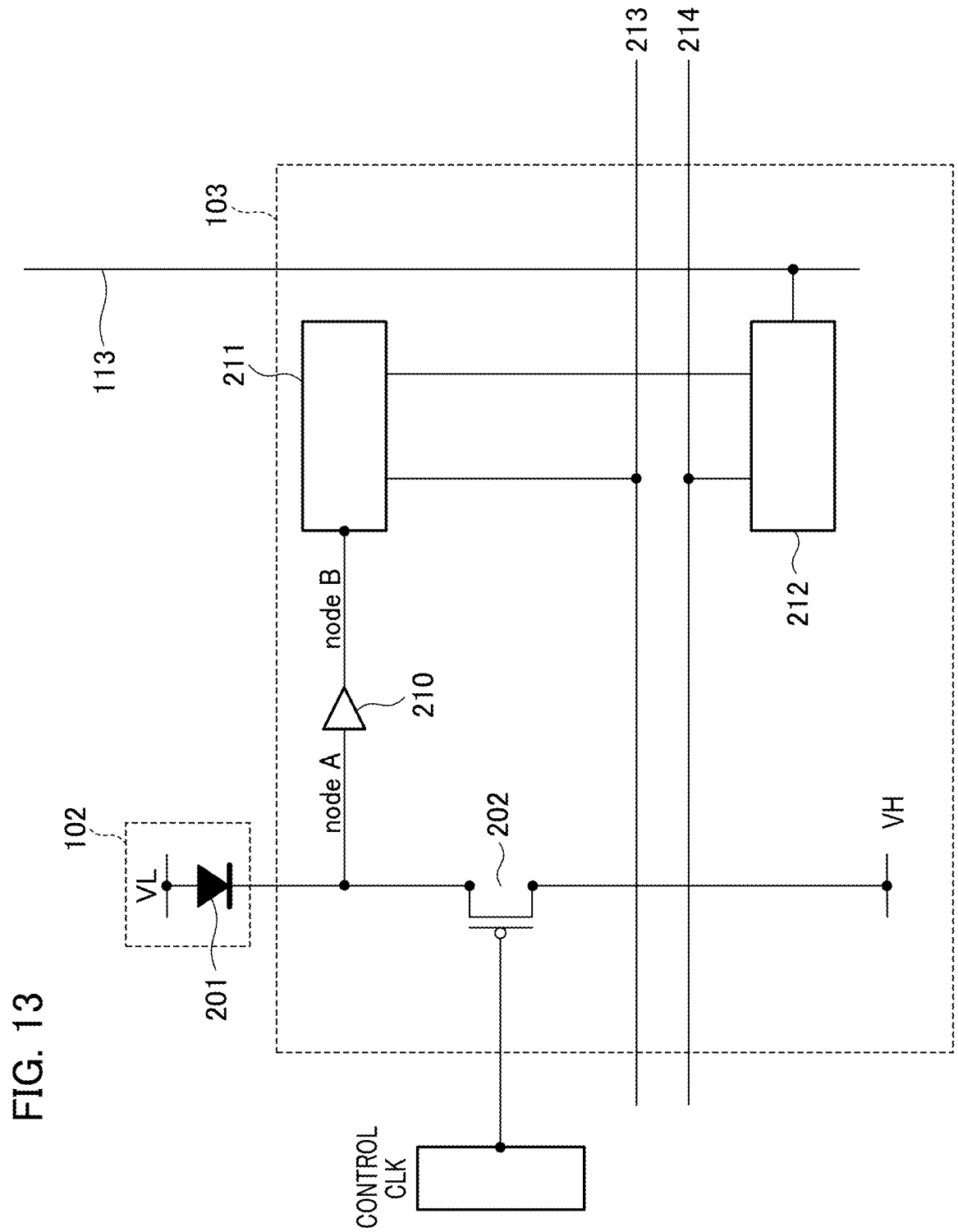
FIG. 13 is a diagram of an equivalent circuit corresponding to a pixel of a photoelectric conversion apparatus according to a Third Embodiment.

The drive method for the photoelectric conversion element of the photoelectric conversion apparatus according to the Third Embodiment differs from that of the photoelectric conversion apparatus according to the First Embodiment. FIG. 13 is an equivalent circuit diagram corresponding to a pixel of the photoelectric conversion element according to the Third Embodiment.

As is shown in FIG. 13, the quench element 202 is configured by an MOS transistor, and the on and off of the quench element 202 (the MOS transistor) is controlled by a control signal CLK that is connected to a gate of the MOS transistor. The control signal CLK for controlling the operations of the quench element is supplied from the control pulse generating unit 115 that serves as a signal generating unit.

Figure 14:
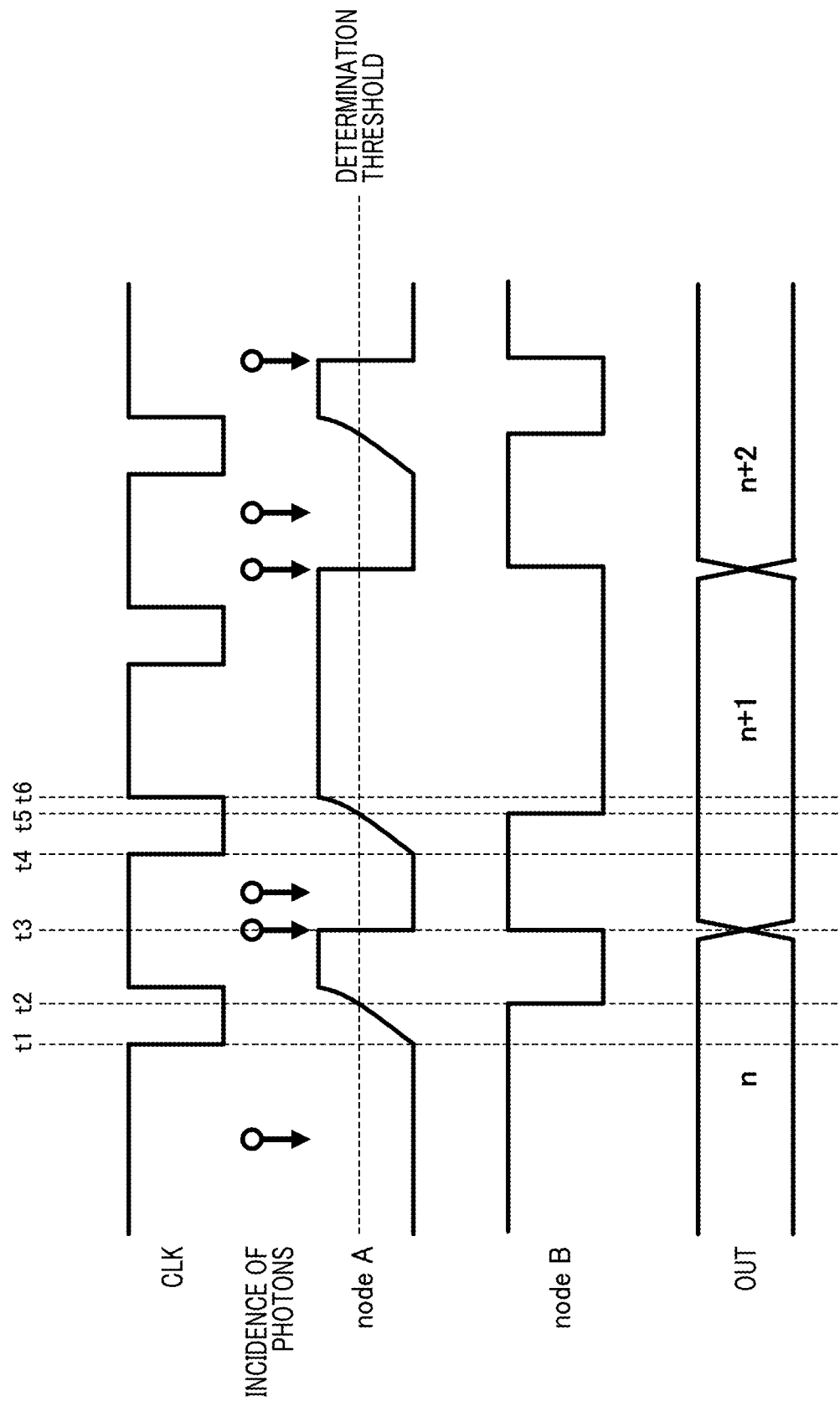
FIG. 14 is a is drive timing chart for a photoelectric conversion element according to the Third Embodiment.

FIG. 14 is a drive timing chart for the photoelectric conversion element according to the Third Embodiment. This diagram shows the relationship between the control signal CLK for the quench element 202, the voltage for the node nodeA, the voltage for the node nodeB, and the output signal OUT of the selection circuit 212 in the photoelectric conversion element that is shown in FIG. 13.

In the photoelectric conversion element of the Third Embodiment, there is a state in which in the case that the control signal CLK is at a high level (for example, 1V), it is difficult for the drive voltage VH to be supplied to the APD, and there is a state in which in the case that the control signal CLK is at a low level (for example, 0V), the drive voltage VH is supplied to the APD. In the case in which the control signal CLK is at a high level, the quench element 202 is turned off, and in the case in which the control signal CLK is at a low level, the quench element 202 is turned on.

The resistance value for the quench element 202 in a case in which the control signal CLK is at a high level becomes a larger resistance value than the resistance value for the quench element 202 in a case in which the control signal CLK is at a low level. Therefore, in a case in which the control signal CLK is at a high level, it becomes difficult to perform a recharging operation even if avalanche multiplication occurs in the APD, and therefore, the voltage that is supplied to the APD becomes a voltage that is at or below the breakdown voltage for the APD. Therefore, the avalanche multiplication operations in the APD are halted.

During the time period t1, the control signal CLK is changed from a high level to a low level, the quench element 202 is turned on, and the recharging operation for the APD begins. The voltage of the cathode of the APD thereby transitions to a high level. In addition, the voltage difference for the voltages that are applied to the anode and the cathode of the APD enter a state in which avalanche multiplication is possible.

The voltage for the cathode is the same as the node nodeA. Therefore, when the voltage of the cathode transitions to a high level from a low level, the voltage of the node nodeA during the time period t2 becomes equal to or greater than the determination threshold. At this time, the pulse signal that is being output from the node nodeB is reversed, and goes from a high level to a low level.

Upon the recharging being completed, a state is reached in the APD 201 in which the voltage difference for the drive voltage VH–the drive voltage VL is applied. After this, the control signal CLK becomes a high level, and the quench element 202 is turned off.

Next, during the time period t3, upon the photons becoming incident on the APD 201, avalanche multiplication occurs in the APD 201, the avalanche multiplication electric current flows into the quench element 202, and the voltage of the cathode is lowered. That is, the voltage of the node nodeA drops. If the voltage of the nodeA becomes lower than the determination threshold while the voltage of the node nodeA is dropping, the voltage of the node nodeB becomes a high level from a low level.

That is, the portion of the output waveform that has exceeded the determination threshold in the node nodeA is waveform shaped by the waveform shaping unit 210, and is output by the nodeB as a pulse signal. In addition, counting is performed in the counter circuit, and the count value for the counter signal that is output from the counter circuit increases by 1 LSB.

Photons become incident on the APD between the time period t3 and the time period t4. However, the quench element 202 is in an off state, and the voltage that is applied to the APD 201 is a voltage difference at which avalanche multiplication is possible, and therefore, the voltage level of the node nodeA does not exceed the determination threshold.

During the time period t4, the control signal CLK changes from a high level to a low level, and the quench element 202 is turned on. In accordance with this, a current that compensates for the voltage drop amount from the drive voltage VL flows through the node nodeA, and the voltage of the node nodeA transitions to the original voltage level. At this time, during the time period t5, the voltage of the node nodeA is at or above the determination threshold, and therefore, the pulse signal for the node nodeB is reversed, and becomes a low level from a high level.

During the time period t6, the node nodeA is statically determined at the original voltage level, and the control signal CLK goes from a low level to a high level. After this as well, the voltages of each of the nodes, control lines, and the like change according to the control signal CLK and the incidence of the photons as was explained during time period t1 to time period t6.

In this manner, it is possible to control the recharging frequency of the APD by applying the control signal CLK to the quench element 202 and thereby switching the quench element 202 on and off in a predetermined cycle.

In a case in which the control signal CLK is not used, there is a problem in which the actual count value will become smaller than the counted value corresponding to the luminance value of the incident light when the luminance value is high. However, it is possible to solve this problem by applying the control signal CLK to the quench element 202 and thereby periodically switching the quench element between on and off.

However, in a case in which the recharging frequency of the APD is controlled by the control signal CLK, the relationship of the output signal number in relation to the input signal number is non-linear. However, in a case in which the effects of luminescent crosstalk are ignored, it is possible to logically deduce the relationship of the output signal number in relation to the input signal number. Specifically, when the input signal number is made Nph, the output signal number is made Nct, the frequency number of the CLK signal (the inverse number of the CLK number per unit of time) is made F, and the length of the exposure time is made T, the following formula 1 is fulfilled.

$$Nct = fT\left(1 - e^{-\frac{Nph}{fT}}\right) \quad \text{[Formula 1]}$$

In the photoelectric conversion apparatus according to the Third Embodiment, correction processing is executed so as to be able to reduce the effect of the non-linear response that occurs due to the control signal CLK, and the effect of erroneous counts that occur due to crosstalk at the same time. This will be explained below.

Figure 15:
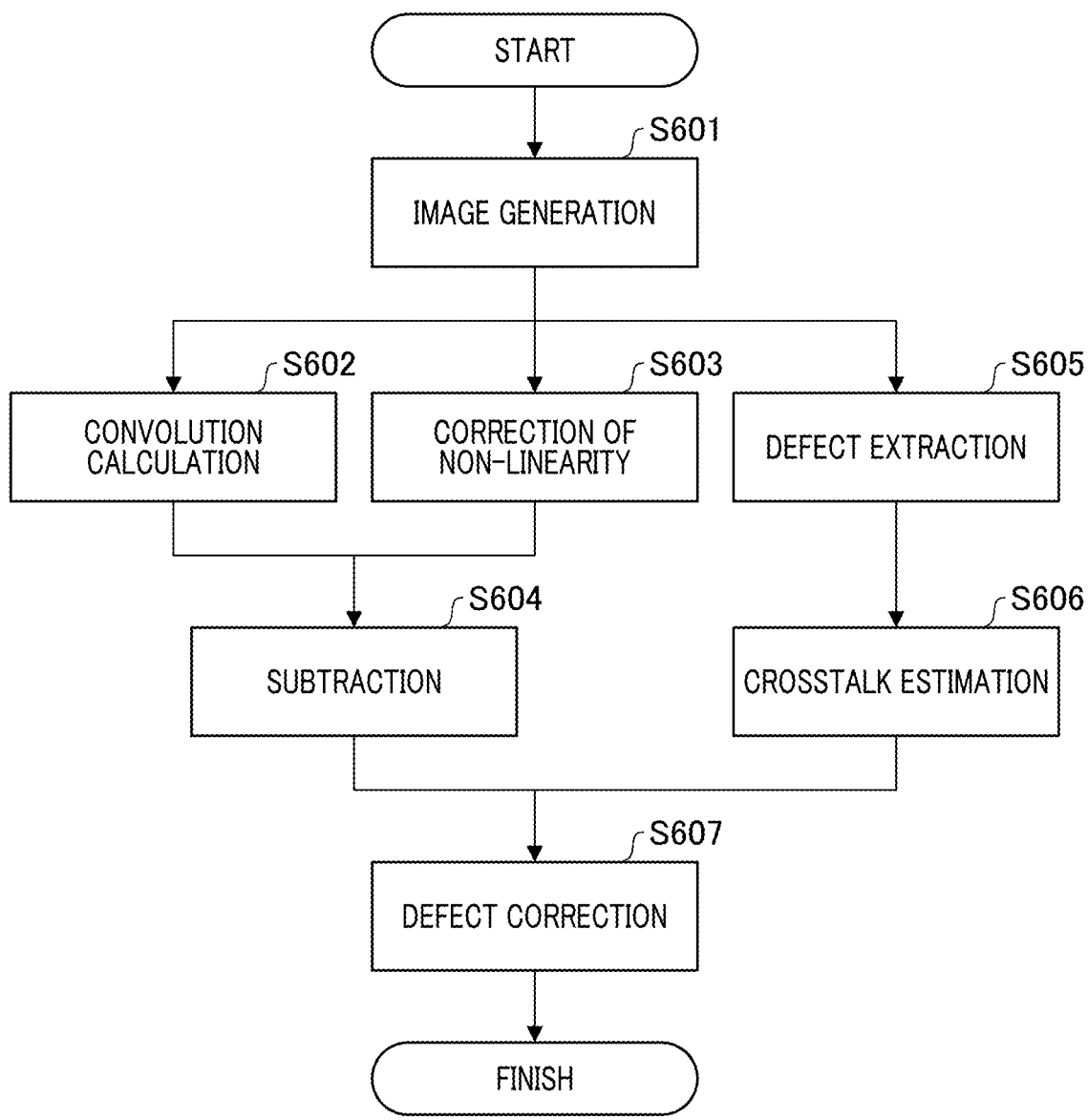
FIG. 15 is a signal processing flowchart for a photoelectric conversion apparatus according to the Third Embodiment.

FIG. 15 is a flowchart of the signal processing for the photoelectric conversion apparatus according to the Third Embodiment. Note that the operations for each of the flowchart in FIG. 15 are performed by the computer inside of the photoelectric conversion apparatus 300 executing a computer program stored in a memory.

Below, an explanation will be given that focuses on the portions that differ from the flowchart in FIG. 8. During step S601, the first image is generated by the image generating unit in the same manner as step S401. After this, the processing bifurcates into the first correction processing and the second correction processing in the same manner as in FIG. 8.

First, the first correction processing will be explained. In the photoelectric conversion apparatus according to the Third Embodiment, the first correction processing is further bifurcated. During step S602, convolution calculation is executed for both the first image and the second array data as has been explained above, and the second image is generated. As was explained above, it is possible to predict the probability of luminescent crosstalk occurring, and therefore, it is possible to predict erroneous counts due to luminescent crosstalk by executing the convolution calculation.

During step S603, non-linear correction processing is performed in relation to the first image in order to return the non-linear response caused by the control signal CLK to a linear state (linear correction), and a ninth image is generated. Specifically, an input signal number Nph is obtained from the output signal number Nct so as to fulfill the following Formula 2.

$$Nph = -fT \times \ln\left(\frac{1 - Nct}{fT}\right) \quad \text{[Formula 2]}$$

After this, during step S604, the second image is subtracted from the ninth image, and a third image is generated. That is, the third image is generated by subtracting the second image, which was generated by convoluting the second array data that was created based on the first array data for the first image, from the ninth image, which was generated by performing non-linear correction processing on the first image.

As has been explained above, the second image is made a signal showing the erroneous counts due to luminescent crosstalk, and therefore, the third image becomes an image in which the signal that could have been obtained in a case in which erroneous counts due to luminescent crosstalk have not occurred has been revived.

In this manner, it is possible to reduce the effects of the non-linear response that occurs due to the control signal CLK and the effects of erroneous counts that occur due to crosstalk at the same time using the processing for steps S602 to S604.

Figure 16:
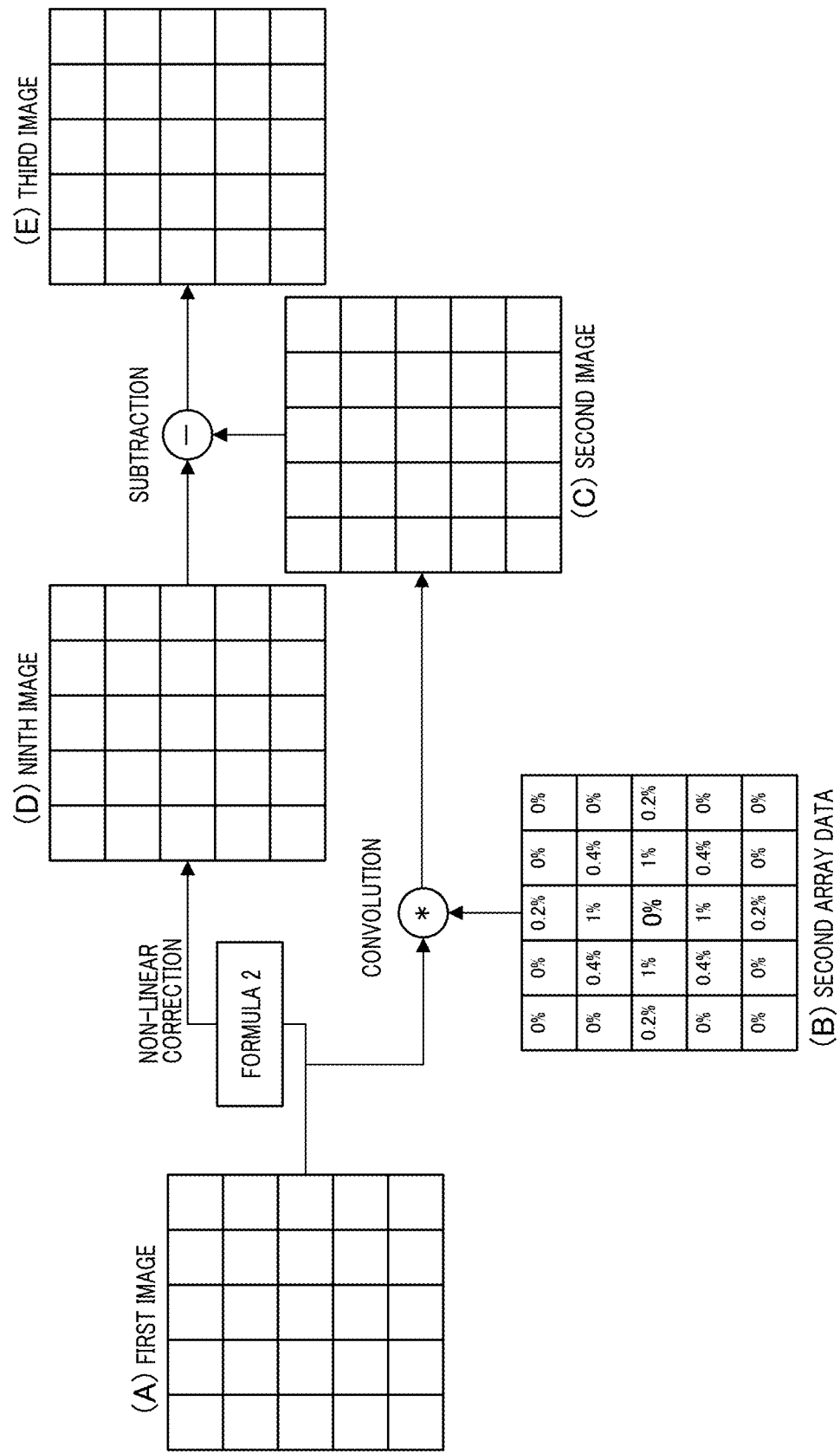
FIG. 16 is a diagram explaining first correction processing according to the Third Embodiment.

FIG. 16 is a diagram explaining the first correction processing according to the Third Embodiment. In FIG. 16, (A) shows the first image, (B) shows the second array data, (C) shows the second image, (D) shows the ninth image, and (E) shows the third image.

Note that the second correction processing in the Third Embodiment is the same as the correction processing for the photoelectric conversion apparatus in the First Embodiment. That is, defect pixels are extracted during step S605, and the third array data is obtained during step S606. After this, during step S607, defect correction is executed with respect to the pixels for which the third array data is at or above the first threshold, and the fourth image is generated.

In the Third Embodiment, it is possible to suppress the nonlinear response caused by the control signal CLK, the effects of the erroneous counts that occur due to crosstalk, and the effects of cluster defects by performing the signal processing that has been described above.

Fourth Embodiment

The photoelectric conversion apparatus according to the Fourth Embodiment differs from the photoelectric conversion apparatus according to the Third Embodiment on the point that the signal processing unit 302 thereof is provided with a gain adjustment unit, which is not shown, that applies a gain to the first image.

Generally, in photoelectric conversion apparatuses that acquire images, the exposure time, F value for the image forming optical system, and the gain of the signal processing circuit (referred to below as the signal gain) change due to the brightness of the subject, and image capturing is performed such that the luminance value for the subject becomes an appropriate value.

In the photoelectric conversion apparatus according to the Fourth Embodiment, in a case in which the value for the signal gain has been changed in order to adjust the brightness, the parameters for the first correction processing and the second correction processing are changed in accordance with this.

Figure 17:
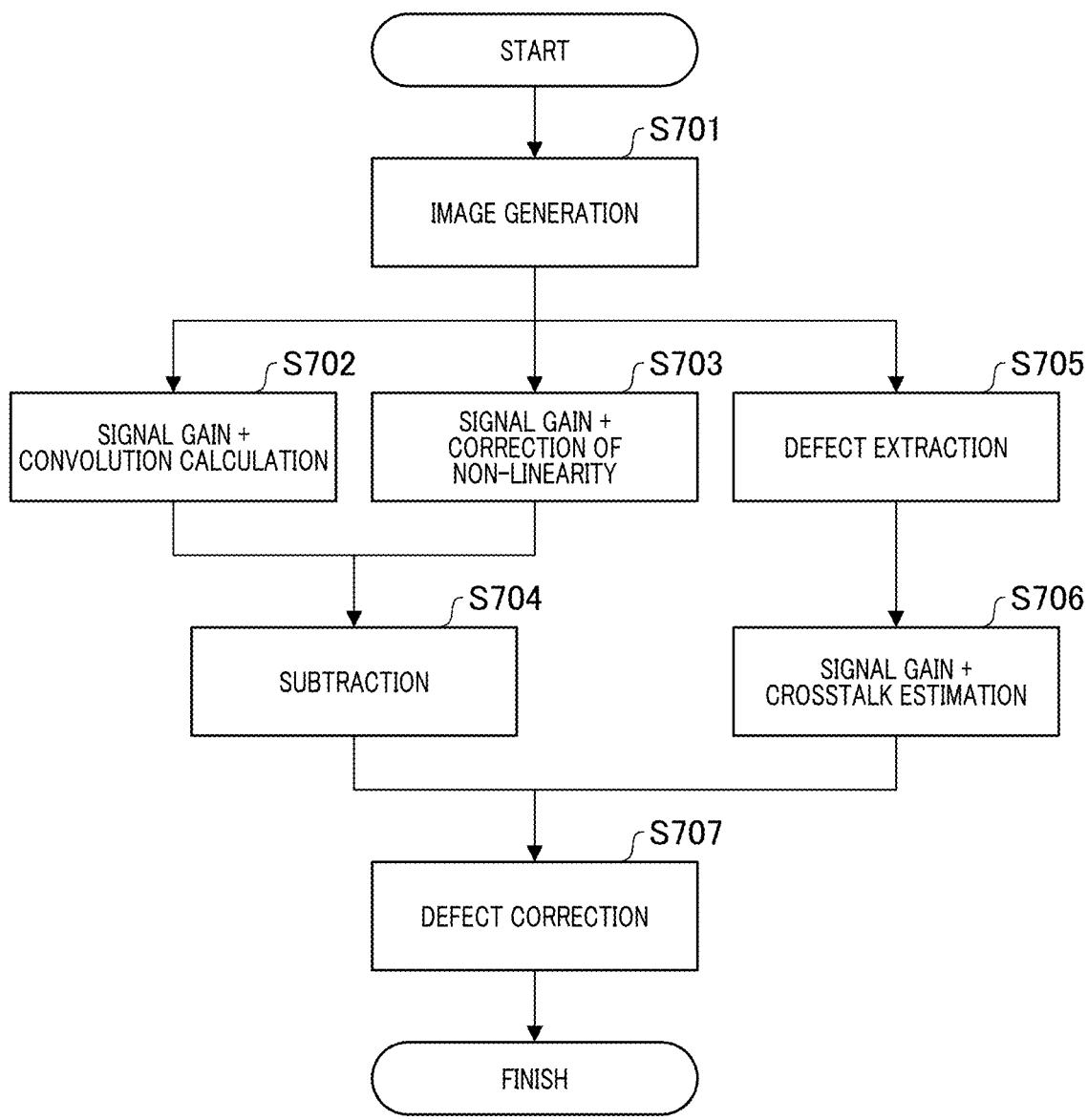
FIG. 17 is a flowchart for signal processing for a photoelectric conversion apparatus according to the Fourth Embodiment.

FIG. 17 is a flowchart for the signal processing for the photoelectric conversion apparatus according to the Fourth Embodiment. Note that the operations for each step in the flowchart in FIG. 17 are executed by the computer inside of the photoelectric conversion apparatus 300 executing a computer program stored in a memory.

Below, an explanation will be given that focuses on the portions that differ from the flowchart in FIG. 16. During step S701 of FIG. 17, the first image is generated in the image generating unit in the same manner as in step S601. After this, the processing is bifurcated into first correction processing and second correction processing in the same manner as in FIG. 16.

During step S702, in a case in which the signal gain for the first image has been adjusted by a gain adjustment unit that is not shown, convolution calculations for the second array data are executed on the first image that has been gain adjusted, and the second image is generated.

The second array data, which is generated based on the probability of luminescent crosstalk occurring, is often a decimal value. The output for the image is generally an integer, and therefore, it is possible to suppress quantization errors and to increase the correction precision by gain adjusting the first image when performing the convolution calculation. Note that a signal gain that is the same as the signal that was applied during step S702 (referred to below as the first gain) is also used during step S703 and step S707.

During step S703, the first gain is applied to the first image in the same manner, and non-linear correction processing that returns the non-linear response that occurs due to the control signal CLK to a linear form is performed, and the ninth image is generated. The Formula 2 is a calculation including logarithms, and therefore, precision of the decimals is necessary. Therefore, in the Fourth Embodiment, when the non-linear correction processing for returning the non-linear response to a linear state is performed, it is possible to suppress quantization errors and to increase the correction precision by applying the first gain to the image.

Note that during step S703, a processing circuit that calculates the Formula 2 may be executed and the input signal number Nph may also be obtained from the output signal number Net, or a look-up table having the characteristics of the Formula 2 may also be used. In the case in which a look-up table is used, if a look-up table in which the first gain and the processing for the return to a linear form have been integrated is used, it is possible to reduce quantification errors, and therefore this is preferable.

Step S704, and step S705 are both the same as step S604, and step S605. That is, during step S704, the second image is subtracted from the ninth image, the third image is generated, and defect pixels are extracted during step S705.

During step S706, the third array data is obtained by applying the first gain to the first image and obtaining the area of the first image and the first array data. In the same manner as in step S702, it is possible to suppress quantification errors and to increase the correction precision by applying the gain in advance in the image when the convolution calculation is performed, After this, during step S707, defect correction is performed with respect to the pixels for which the third array data is at or above the first threshold, and the fourth image is generated.

In this manner, in the case of a photoelectric conversion apparatus having a gain adjustment unit that adjusts the signal gain, it is preferable if the parameters of the second correction processing are changed according to the value of the signal gain. The effects caused by cluster defects visually stand out the darker the brightness of the subject is and the larger that the value for the signal gain that is applied in order to adjust the brightness is.

Therefore, it is preferable that the larger the value for the signal gain is, the smaller the first threshold is made, and the larger the ratio of the pixels that are the correction targets in step S707 is made. In other words, it is preferable if the second correction processing is made stronger the larger the value for the signal gain that is applied in the gain adjustment unit is.

In the same manner, it is preferable if the parameters of the first correction processing are also changed according to the value of the signal gain. In a case in which the response from the control signal CLK is non-linear, the effects of the crosstalk become larger the smaller the output signal number Nct is.

Therefore, it is preferable that the size of the second array data that is used in the convolution calculation is made larger and each coefficient for the second array data is also made larger the darker that the brightness of the subject is and the larger the value for the signal gain that is applied in order to adjust the brightness is. In other words, it is preferable if the first correction processing is made stronger the larger the value for the signal gain that is applied in the gain adjustment unit is.

Furthermore, it is preferable if both the parameters for the first correction processing and the parameters for the second correction processing are changed at the same time by the gain signal. In a case in which the size of the second array data is made larger and each coefficient for the second array data is made larger, it becomes easy for the apparatus to be affected by differences in the probability for luminescent crosstalk due to cluster defects and structural inconsistencies.

In this context, it is preferable to reduce the effects of cluster defects by changing the size and coefficients for the second array data along with changing the first threshold. In other words, it is preferable to make both the first correction processing and the second correction processing stronger the larger the value for the signal gain is.

In addition, the value for the frequency number f of the control signal CLK may also be changed according to the value of the signal gain. As can be understood from the Formula 1, the saturation level for Nct is proportional to f×T, and therefore, if the length T for the exposure time is the same, the saturation levels for the frequency number f of the control signal CLK and Nct will be proportional. Therefore, it is preferable if the value for the signal gain is made larger and the brightness is made brighter the lower that the frequency number f for the control signal CLK is.

Formula 2 is dependent on the frequency number f of the control signal CLK, and therefore, it is preferrable if the non-linear correction processing during step S703 is also changed according to the frequency number f. In a case in which a look-up table having the characteristics of the Formula 2 is used, it is sufficient if a look-up table that differs according to the frequency number f of the control signal CLK is used.

As can be understood from the Formula 1, if the length T for the exposure time is the same, the effect due to crosstalk will be larger the smaller the frequency number f for the control signal CLK is, due to the non-linear form caused by the response. Therefore, it is preferable to make the size of the second array data that is used in the convolution calculation larger and to make each coefficient for the second array data larger the smaller that the frequency number f is. That is, it is preferable to make the first correction processing stronger the smaller that the frequency number f is.

Fifth Embodiment

Figure 18:
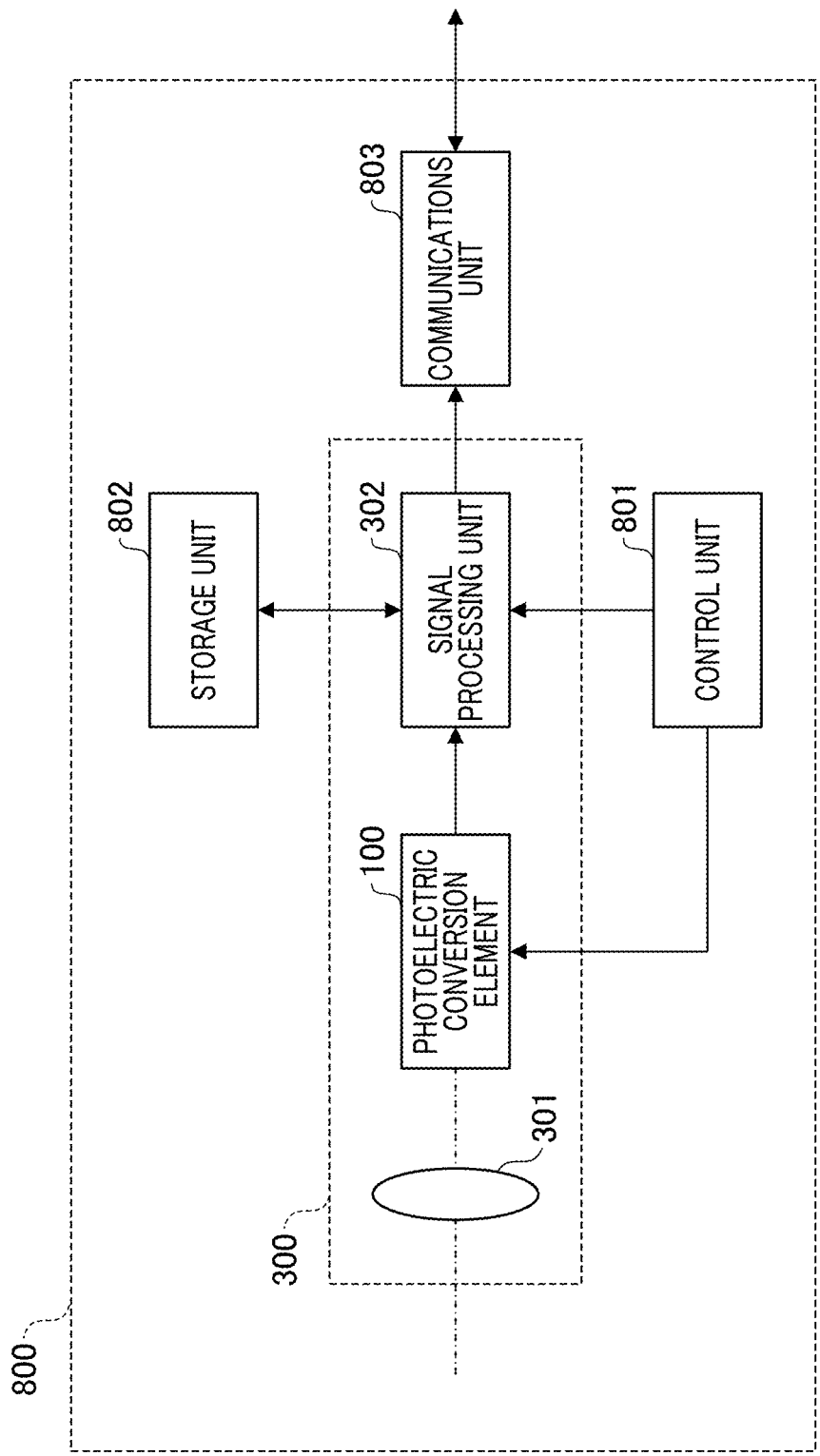
FIG. 18 is a functional block diagram for a photoelectric conversion system according to the Fifth Embodiment using a photoelectric conversion apparatus from the First Embodiment to the Fourth Embodiment.

FIG. 18 is a functional block diagram of a photoelectric conversion system according to the Fifth Embodiment that uses the photoelectric conversion apparatus according to the First Embodiment to the Fourth Embodiment. The photoelectric conversion system 800 includes a photoelectric conversion apparatus 300 having a photoelectric conversion element 100, a control unit 801, a storage unit 802, and a communications unit 803.

An optical image that is formed by the image forming optical system 301 is image captured in the photoelectric conversion element 100. Image generation, first correction processing, and second correction processing are performed in the signal processing unit 302 on the signal that has been read out from the photoelectric conversion element 100.

Furthermore, processing such as black level correction, gamma curve adjustment, noise reduction, data compression, and the like are performed in the signal processing unit 302, and a final image is generated. In addition, in a case in which the photoelectric conversion element 100 has an RGB on-chip color filter, it is preferable to also performed processing such as white balance correction, color conversion, and the like in the signal processing unit 302.

Note that a CPU, which is not shown, is built into the control unit 801 to serve as a computer, and the operations of each unit of the entirety of the photoelectric conversion system 800 are controlled based on a computer program stored in a memory, which is not shown, that serves as a storage medium. In addition, the control unit 801 performs the control of the length of the exposure time for each frame of the photoelectric conversion element 100, the timing of the control signal CLK, and the like via a control pulse generating unit of the photoelectric conversion element 100.

The storage unit 802 includes storage mediums such as, for example, memory cards, hard disks, and the like. The communications unit 804 is provided with a wireless or wired interface, and outputs the generated image to outside of the photoelectric conversion system 800 while also receiving an external signal.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the photoelectric conversion apparatus through a network or various storage media. Then, a computer (or a CPU, an MPU, or the like) of the photoelectric conversion apparatus may be configured to read and execute the program. In such a case, the program and the storage medium storing the program configure the present invention.

In addition, the present invention also includes, for example, an invention that is realized by at least one processor or circuit configured to function as the embodiments explained above. Note that this may also be made such that distribution processing is performed by using a plurality of processors.

This application claims the benefit of Japanese Patent Application No. 2022-154904, filed on Sep. 28, 2022, which is hereby incorporated by reference herein in its entirety.

What is claimed is:

1. A photoelectric conversion apparatus comprising:
   a photoelectric conversion element including an avalanche photodiode that photoelectrically converts an optical image;
   at least one memory storing instructions; and
   at least one processor that, upon execution of the stored instructions, is caused to:
   (1) generate a first image based on a signal acquired by the photoelectric conversion element;
   (2) acquire first characteristic information related to crosstalk between pixels of the photoelectric conversion element;
   (3) perform first correction processing for correcting linearity of the first image using the first characteristic information; and
   (4) perform second correction processing for performing pixel interpolation based on the first characteristic information and information of the first image,
   wherein the first characteristic information relates to a crosstalk characteristic between pixels that occurs due to an avalanche luminescence phenomenon.

2. The photoelectric conversion apparatus according to claim 1, wherein the first characteristic information includes two-dimensional array data, and
   wherein one-dimensional data for at least one row or one column of the two-dimensional array data has a peak value at a center of the one-dimensional data.

3. The photoelectric conversion apparatus according to claim 1, wherein the second correction processing comprises:
   processing to generate third array data based on the first characteristic information and a pixel value of the first image; and
   processing to correct a pixel value of the third image based on the third array data.

4. The photoelectric conversion apparatus according to claim 3, wherein the third array data is generated by multiplying the first characteristic information and the pixel value of the first image, and wherein pixel values of the third data array at or above a first threshold are interpolated using pixel values of the third array data less than the first threshold.

5. The photoelectric conversion apparatus according to claim 1, wherein the photoelectric conversion element has a plurality of pixels with different spectral characteristics.

6. The photoelectric conversion apparatus according to claim 4, wherein the photoelectric conversion element has a plurality of pixels with different spectral characteristics, and wherein for each of the pixels with different spectral characteristics, pixel values of the third array data at or above the first threshold are interpolated using pixel values of the third array data less than the first threshold.

7. The photoelectric conversion apparatus according to claim 6, wherein the second correction processing comprises:

processing the first image, and for each of the pixels having different spectral sensitivity, to extract defected pixels by comparing output of each pixel with outputs of surrounding pixels.

8. The photoelectric conversion apparatus according to claim 1, wherein the photoelectric conversion element includes a quench element that is connected to a power supply and one of an anode or a cathode of the avalanche photodiode, and wherein the instructions further cause the at least one processor to supply a control signal for controlling operations of the quench element.

9. The photoelectric conversion apparatus according to claim 1, wherein the instructions further cause the at least one processor to apply a gain to the first image.

10. The photoelectric conversion apparatus according to claim 9, wherein the first correction processing is made stronger the larger that the gain that is applied by the gain adjusting unit is.

11. The photoelectric conversion apparatus according to claim 9, wherein the photoelectric conversion element includes a quench element that is connected to a power supply and one of an anode and a cathode of the avalanche photodiode, wherein the instructions further cause the at least one processor to supply a control signal for controlling operations of the quench element, and wherein a value of the gain that is applied by the gain adjusting unit is made larger the lower of a frequency number the control signal has.

12. The photoelectric conversion apparatus according to claim 8, wherein the first correction processing is made stronger the lower of a frequency number the control signal has.

13. A photoelectric conversion apparatus comprising:

a photoelectric conversion element including an avalanche photodiode that photoelectrically converts an optical image;

at least one memory storing instructions; and at least one processor that, upon execution of the stored instructions, is caused to:

(1) generate a first image based on a signal acquired by the photoelectric conversion element;

(2) acquire first characteristic information related to crosstalk between pixels of the photoelectric conversion element;

(3) perform first correction processing for correcting the first image using the first characteristic information; and (4) perform second correction processing for performing pixel interpolation based on the first characteristic information and information of the first image, wherein the second correction processing is defect correction processing that interpolates a signal of defective pixels using a signal of surrounding pixels.

14. A control method for controlling a photoelectric conversion apparatus comprising a photoelectric conversion element including an avalanche photodiode for photoelectrically converting an optical image, the control method comprising:

generating a first image based on a signal that has been acquired by the photoelectric conversion element;

acquiring first characteristic information of the photoelectric conversion element;

performing first correction processing for correcting the first image using the first characteristic information; and performing second correction processing for pixel interpolation based on the first characteristic information and information of the first image, wherein the first characteristic information relates to a crosstalk characteristic between pixels that occurs due to an avalanche luminescence phenomenon.

* * * * *